Dec. 5, 1961  H. A. BRUNSON  3,011,790
CHANCE CONTROLLED TICKET DISPENSING MACHINE
Filed Oct. 23, 1956  8 Sheets-Sheet 1

INVENTOR.
HERMAN A. BRUNSON
BY
ATTORNEY

Dec. 5, 1961  H. A. BRUNSON  3,011,790
CHANCE CONTROLLED TICKET DISPENSING MACHINE
Filed Oct. 23, 1956  8 Sheets-Sheet 2
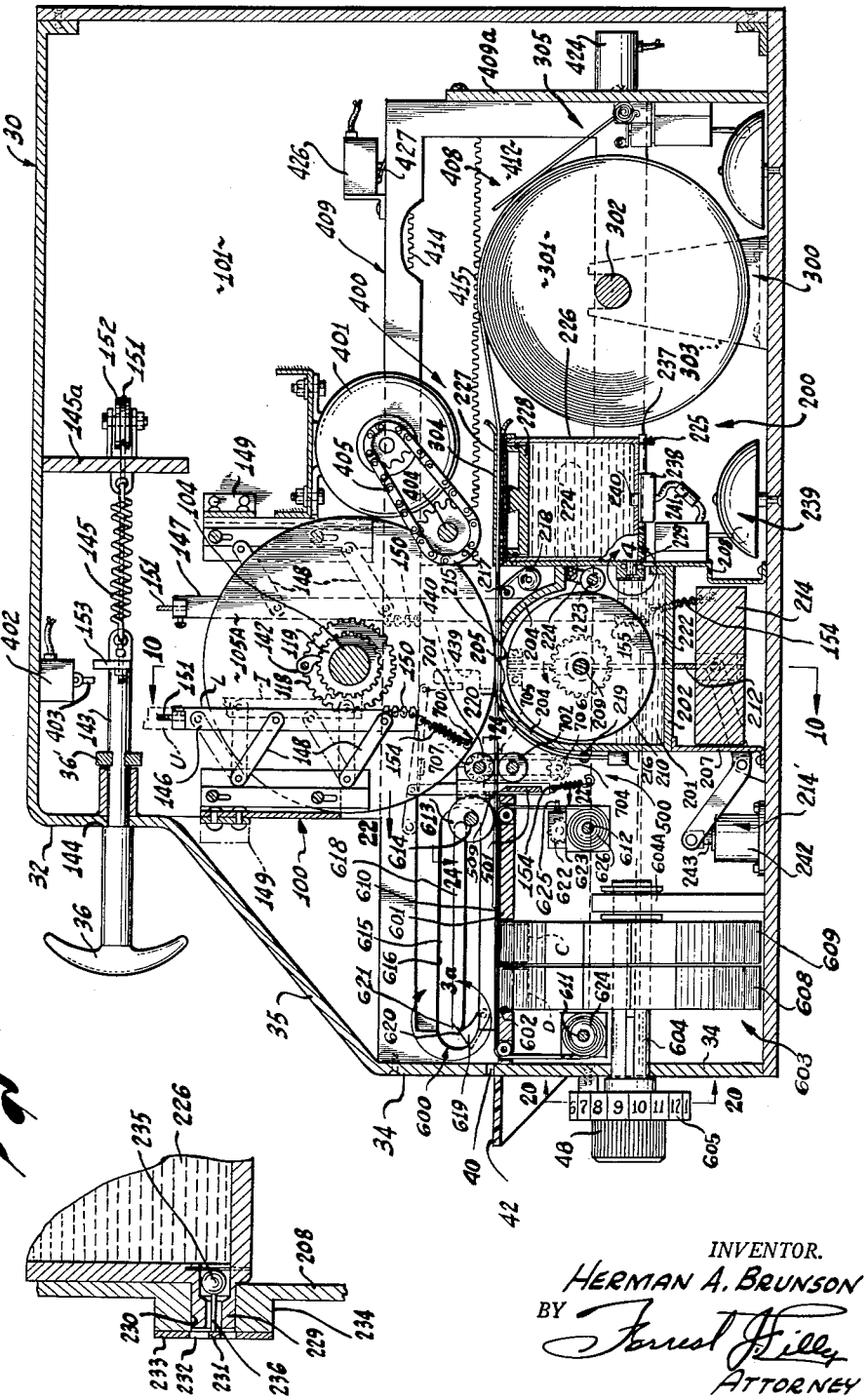
INVENTOR.
HERMAN A. BRUNSON
BY
ATTORNEY

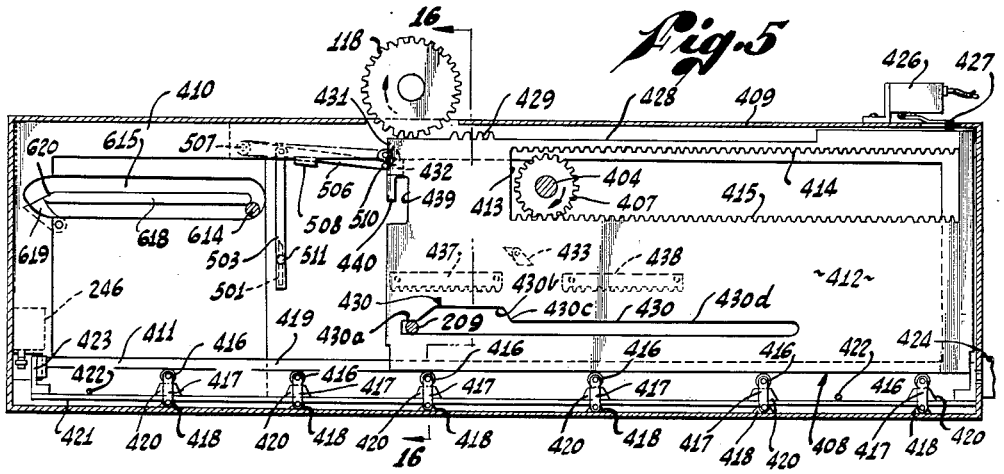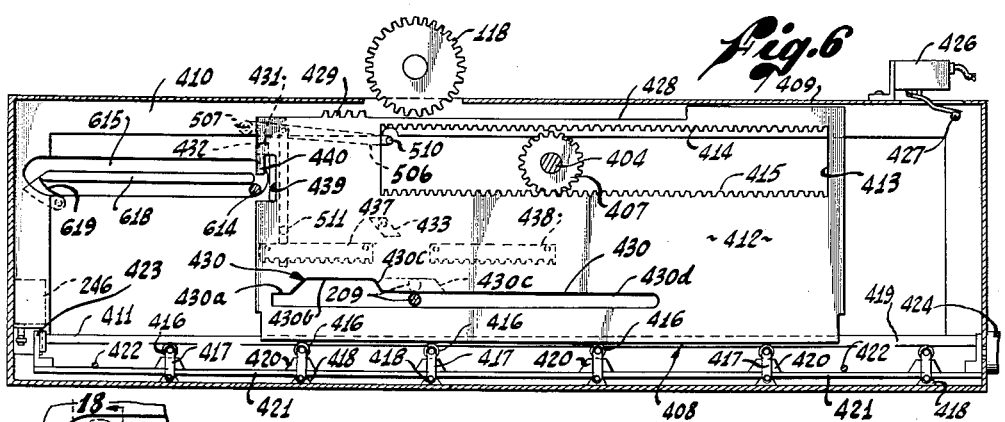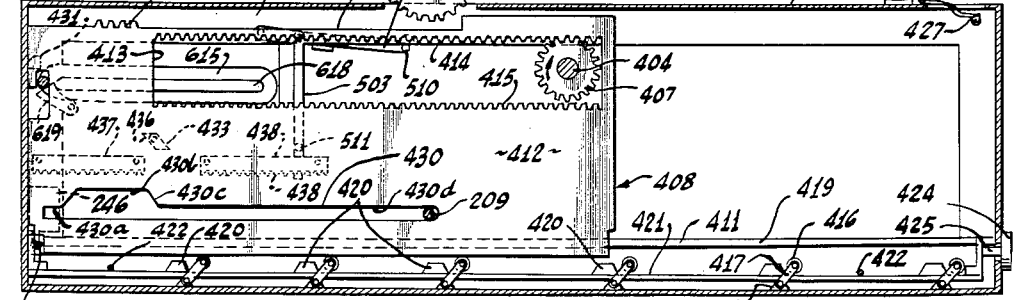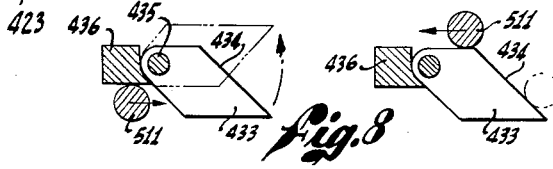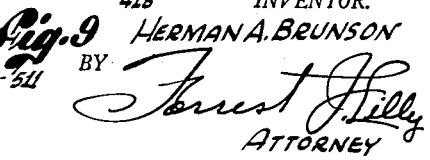

INVENTOR.
HERMAN A. BRUNSON
BY
ATTORNEY

Dec. 5, 1961 H. A. BRUNSON 3,011,790
CHANCE CONTROLLED TICKET DISPENSING MACHINE
Filed Oct. 23, 1956 8 Sheets-Sheet 5
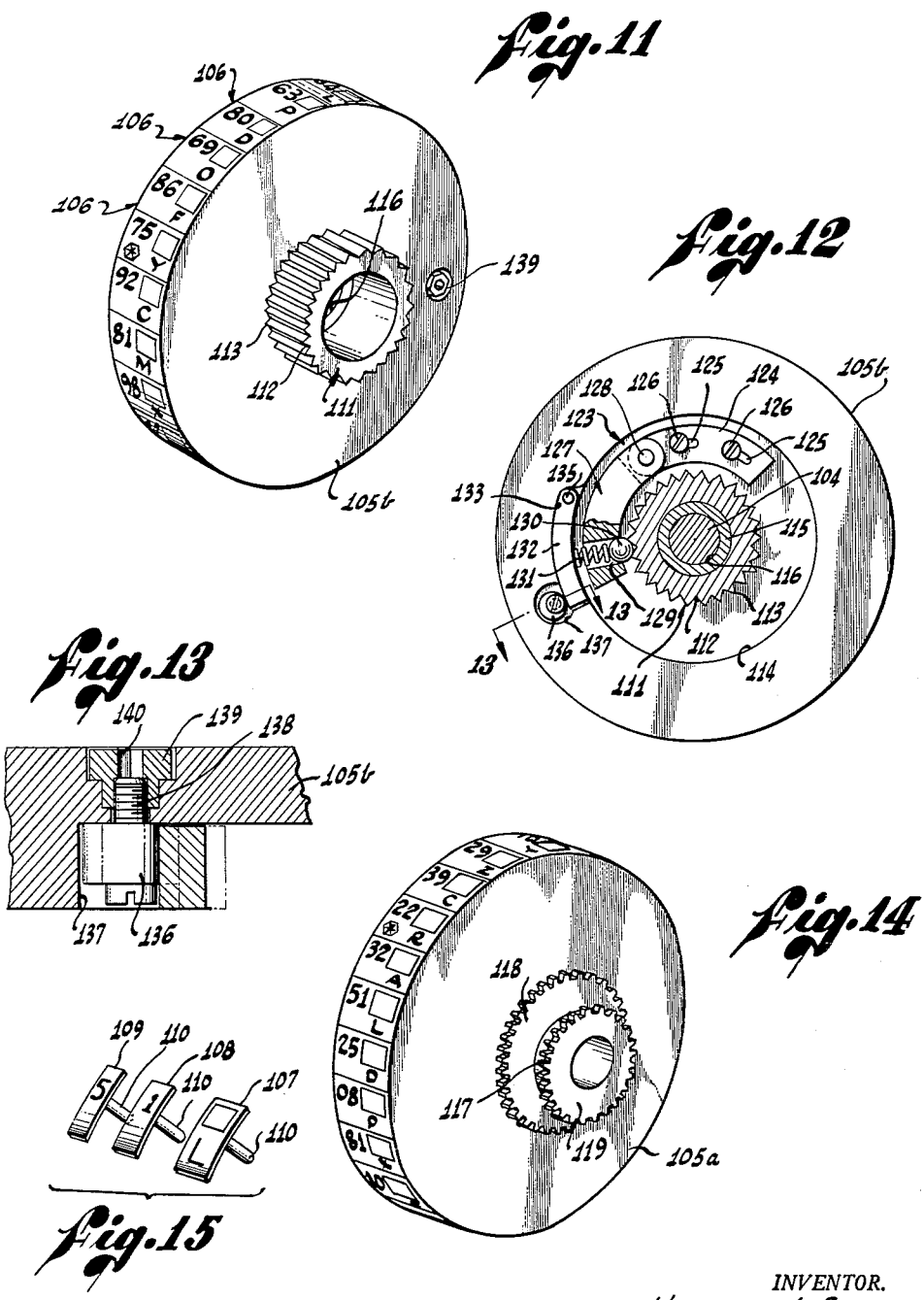
INVENTOR.
HERMAN A. BRUNSON
BY
ATTORNEY

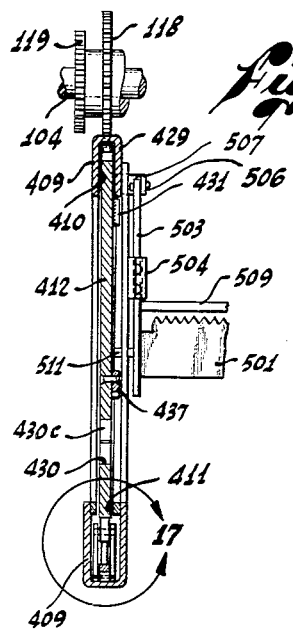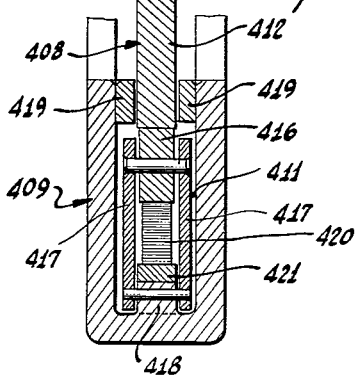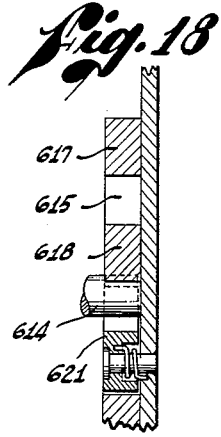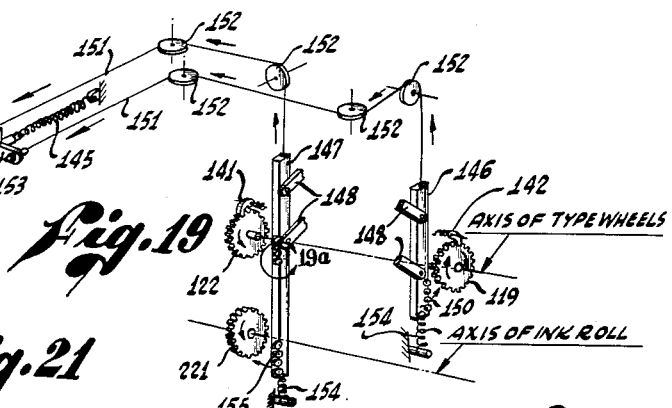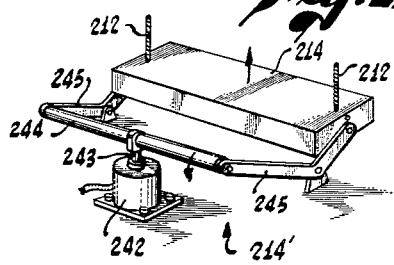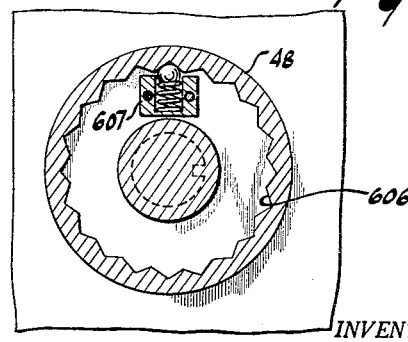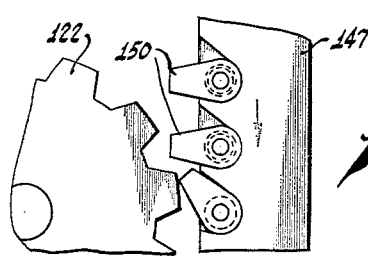

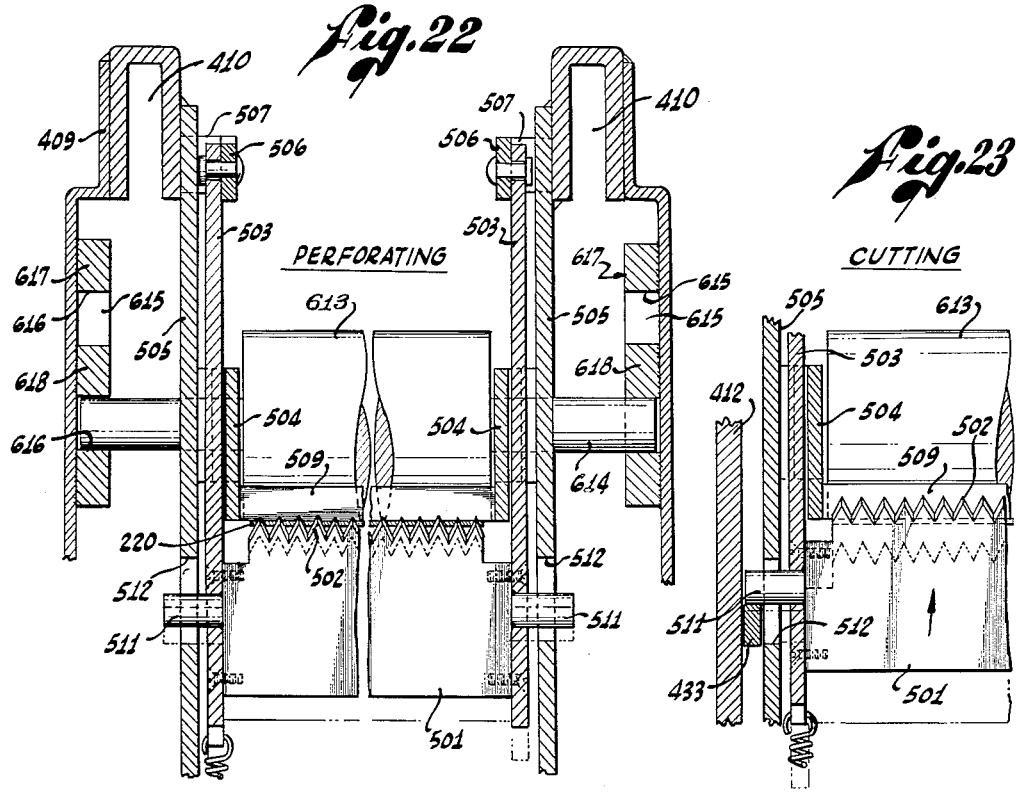
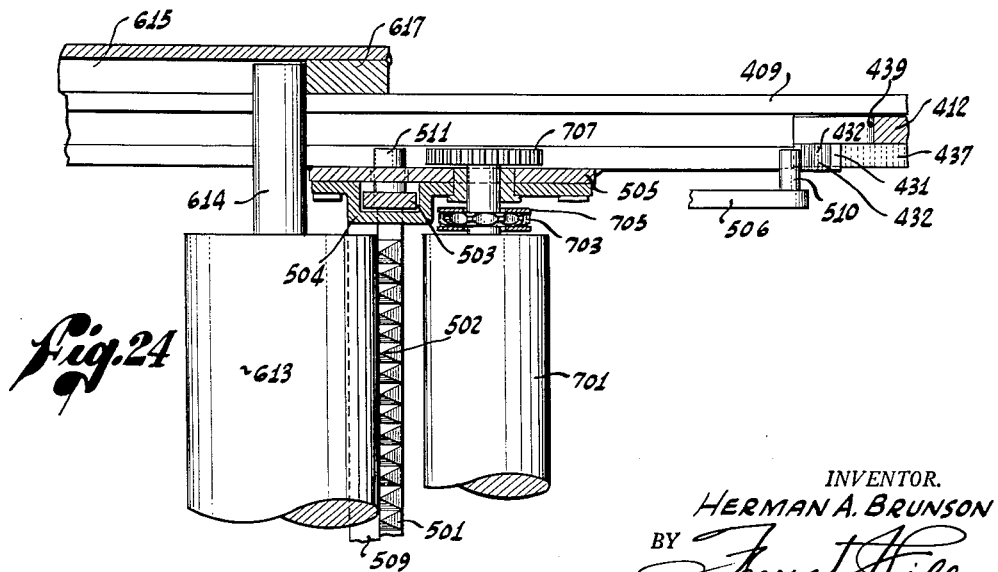

Dec. 5, 1961      H. A. BRUNSON      3,011,790
CHANCE CONTROLLED TICKET DISPENSING MACHINE
Filed Oct. 23, 1956      8 Sheets-Sheet 8
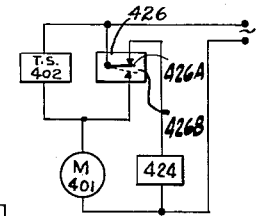
*fig. 25*
*fig. 26*
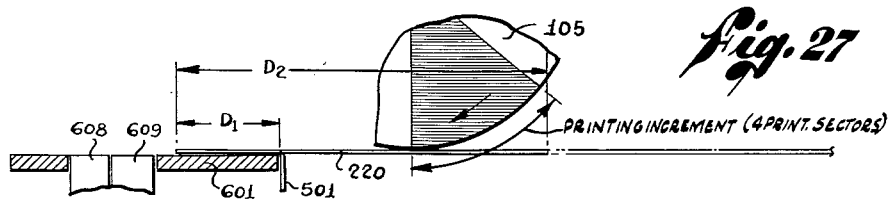
*fig. 27*
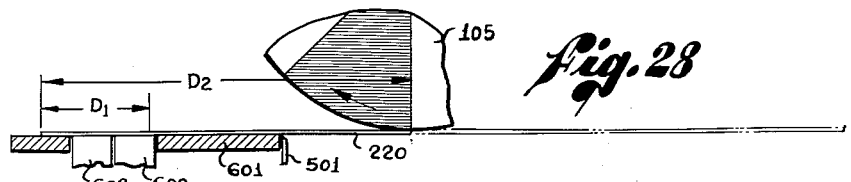
*fig. 28*
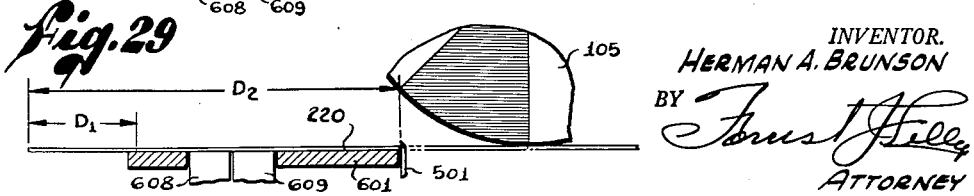
*fig. 29*
INVENTOR.
HERMAN A. BRUNSON
BY
ATTORNEY

United States Patent Office 3,011,790
Patented Dec. 5, 1961

3,011,790
CHANCE CONTROLLED TICKET DISPENSING MACHINE
Herman A. Brunson, 410 S. Hauser Blvd.,
Los Angeles 36, Calif.
Filed Oct. 23, 1956, Ser. No. 617,765
13 Claims. (Cl. 273—143)

This invention relates to a machine for printing and dispensing game charts, coupons bearing game charts, and the like, and particularly to a vending machine of this character embodying chance selected printing media.

Numerous applications and uses exist for a machine of the instant type. According to one of these uses, and that with which the illustrative embodiment of the invention is concerned, a series of the machines are sponsored, on a rental or percentage basis, by one or more merchandisers and placed in markets, stores, and other merchandising establishments where the sponsors' products are sold.

The present machine, when designed for such applications, is preferably conditioned for operation by insertion of a coin. In accordance with instructions displayed on the front of the machine, the user then initiates operation of the machine by operation of suitable means. Preferably, for reasons hereinafter more fully described, this means comprises a manual operating handle, which imparts relative movement to a series of relatively movable printing wheels, each bearing a series of indicia to be printed. These wheels are brought to rest in chance fashion with indicia thereon in position for printing on a web of paper in the machine a series of chance selected indicia comprising the game chart of the coupon.

Preferably, movement is imparted to these wheels directly by the user of the machine, rather than by some intermediate electrical or electric mechanical means embodied in the machine, in order to increase the chance characteristics inherent in the machine itself. That is, the slightly varying forces applied to the wheels by different users introduce an additional chance factor into the chance selection of the indicia on the wheels. The illustrative machine also embodies manually operable printing means bearing the names of the various subscribers or sponsors of the machine and their products. These latter printing means are initially preset by the user, in accordance with the instructions displayed on the machine, for printing on the coupon dispensed by the machine, a selected one of the sponsor's names and a list of his products.

Operation of the machine after initiation thereof by the user is automatic to cause printing on the web of paper in the machine the chance selected indicia, the selected sponsor's name and his products, as well as other identifying and informative information, such as the date, location of the machine, identifying serial numbers, etc., perforating and shearing of the web to form a detached coupon, and finally dispensing of the latter to the user.

The dispensed coupon is perforated to enable detachment, for retention by the user, of the game chart portion of the coupon bearing the chance selected indicia. The other portion of the coupon, bearing certain informative and identifying information is turned in to the establishment where the machine is located. The purchaser receives in exchange for the coupon various products of the selected sponsor, as listed on the coupon, to a purchase price totaling or substantially totaling the denomination of the coin or coins inserted in the machine.

At periodic intervals the sponsors of the machine will hold drawings for selecting at random a series of indicia corresponding to those printed by the machine. These randomly selected indicia will be publicized, in some suitable manner, such as in newspapers, on bulletin boards in the various merchandising establishments wherein the machines are placed, and so forth, to enable the users of the machine to determine which, if any, of the randomly selected indicia are contained on the game chart retained by them. The chance selected indicia on the chart may be printed, for example, in a series of squares on the order of a bingo card. Prizes may be awarded, for example, to that person whose chart contains the greatest number of the randomly selected indicia or whose chart is first completely filled.

The invention, therefore, in one of its aspects, provides a device for combining advertising with customer purchases and promoting the customer's incentive to purchase certain products. Thus, for example, the machine might be employed as an advertising scheme for introducing new products or boosting the sales of old products, by requiring the purchaser to select a given sponsor and certain of his products in exchange for the opportunity to win valuable prizes and yet obtain full value for the money inserted by him in the machine.

It will become apparent as the description proceeds that the broad concept of the invention is susceptible of numerous physical embodiments, depending on the particular type of products or services handled by the sponsors of the machine or the different types of contests or games in which the machine is intended to be used. The invention possesses certain inherent features which render it uniquely suitable and practical for any one or all of these various uses and applications. Thus, in all game and contest applications of the machine, it is desirable that the probability of duplication of the chance selected indicia on two or more game charts be substantially non-existent. It will be appreciated as the description proceeds that with the present invention, the probability of such duplication is extremely remote, with the odds being on the order of one in several billion for the printed, chance selected indicia to be identical on two charts.

In addition to the commercial advertising and merchandising advantages of the invention, it will be appreciated that there is provided a new method of control for games to be conducted by charitable institutions and the like for the purpose of raising funds. Thus, machines embodying this invention are inherently extremely easy to police, prevent fraud, and insure honest pay-off to the winners according to the established rules and regulations of a particular game or contest with which the machine is concerned.

In the light of the foregoing discussion, a broad object of this invention may be stated as being the provision of a vending machine for printing and dispensing coupons, game charts, and the like, bearing chance selected indicia.

Another object of the invention is the provision of a vending machine of the character described in which the number of indicia from which the indicia to be printed by chance selection are chosen is relatively large, so that the probability of printing duplicate forms is extremely remote and substantially non-existent.

Yet another object of the invention is the provision of a vending machine of the class described which is capable of adjustment to vary the chance selection characteristics thereof.

A further object of the invention is the provision of a vending machine of the class described which becomes operative in response to initial actuation of the machine by a user to first select in chance fashion a series of indicia to be printed, then print on a chart or coupon the chance selected indicia, together with certain identifying and informative information, and finally dispense the chart or coupon to the user of the machine.

Yet a further object of the invention is the provision of the vending machine of the class described which is tamper-proof so as to insure printing of the indicia in truly chance fashion and wherein the chance characteristics inherent in the machine itself are increased, owing to the different forces applied to the actuating means of the machine by different users.

A still further object of the invention is the provision of a vending machine of the class described wherein the chance selected indicia are replaceable to permit employment of indicia which are especially suitable for various games and contests in which the machine may be employed, and which is adjustable to vary the chance characteristics of the machine.

A still further object of the invention is the provision of a vending machine of the class described which is uniquely designed for use in planned advertising schemes of the character mentioned and other applications wherein chance selected indicia are required, and which is especially advantageous in such applications, owing to its ability to chance select and print desired indicia, its tamper-proof construction, the ease with which it may be policed, and its reliability, stemming from its substantially mechanical construction and operation.

Other objects, advantages and features of the invention will become apparent as the description proceeds.

Briefly, the above and other objects of the invention are achieved in the illustrative embodiment thereof by the provision of a housing containing the working mechanism of the machine. This housing is normally sealed and locked so as to permit access to the working parts of the machine only by authorized personnel. Contained within the housing is a roll of paper, preferably safety paper, from which a web of paper is fed below a series of coaxial printing wheels and over a fixed type plate to an exit slot at the forward side of the housing. Located below the printing wheels is an inking mechanism comprising a vertically movable inking roller. This roller is biased in an upward direction to press the web of paper against the peripheries of the printing wheels, by means of a counterweight. The counterweight is normally retained in elevated position so that the inking roller normally occupies its lower position spaced from the peripheries of the printing wheels.

Located at opposite sides of the machine, within the housing, are operating means comprising a pair of slide plates, each longitudinally slotted and having teeth formed along the upper and lower edges of the slots. A pair of gears, driven from a main drive motor, are received in these slots and adapted to engage one or the other of the rows of these teeth for driving the slide plates in forward and rearward directions. Normally, that is prior to actuation of the machine, these gears are meshed with the teeth formed along the lower edge of slots in the slide plates and are rotated by the drive motor in a direction to feed the slide plates from a normal rearward position toward the front of the machine. The slide plates are supported in an upper position during this forward movement by series of rollers on which the lower edge of the slide plates ride. These rollers, in turn, are supported in elevated position by series of camming blocks attached to a common slide bar.

The arrangement is such that the slide bars are engaged by their respective slide plates upon movement of the latter to a forward limiting position to cause retraction of the blocks from below the rollers, thereby permitting the latter to drop to a lower position. The slide plates, which are supported on these rollers, also drop to bring the driving gears into mesh with the teeth formed along the upper edges of the slots in the slide plates. The direction of rotation of the gears remains the same so that the slide plates are driven in reverse direction toward their normal position at the rear of the machine.

Upon movement of the slide plates to their rear limiting position, a slide bar actuating solenoid is energized to move the camming blocks under the rollers, thereby elevating the latter and the slide plates to reengage the slide operating gears with the teeth formed along the lower edges of the slots in the slide plates. Energization of the drive motor is simultaneously terminated to complete one operating cycle of the machine.

The printing wheels, illustratively shown as five in number, are journalled on a common supporting shaft, and each is interconnected with the adjacent wheel or wheels through a ball detent indexing arrangement. The number of indexing positions established by this detent means is equal in number to the number of printing sectors on the wheels, shown as 26 sectors. Two of the wheels are interconnected with the stationary frame of the machine by additional detent indexing means.

The arrangement is such that when rotation is imparted to the printing wheels, the latter rotate relatively freely on the shaft and are gradually brought to rest, by the action of the indexing means between the wheels and between two of the wheels and the stationary frame, with a series of indicia on the wheels in printing position. Rotation is thus imparted to the wheels by manual operation of an actuating handle.

Associated with this actuating handle and set into operation by movement thereof is a timing device which is preset to initiate operation of the drive motor after a predetermined time sufficient to assure the printing wheels having been brought to rest in printing position. Driving of the drive motor advances the slide plates forwardly, as previously described. During this forward movement of the slide plates, the web of paper is first perforated and then the inking roller is moved upwardly to apply pressure to the web of paper for printing on the web the chance selected indicia on the printing wheels.

Continued forward movement of the slide plates rotates the printing wheels, the latter being turned through four printing sectors for printing of four rows of chance selected indicia on the paper. It will be appreciated, as the description proceeds, that the number of printing sectors through which the wheels turn, and, therefore, the number of rows of chance selected indicia printed, may be varied. This rotation of the printing wheels advances the web of paper through the machine to a position wherein the forward or leading portion of the paper overlies the type plate. The slide plates then operate to cam the inking roller downwardly away from the printing wheels to terminate feeding of the paper.

Continued forward motion of the slide plates bring the latter into engagement with a pressure roller associated with the type plate. This roller is moved over the type plate by forward movement of the slide plates to press the paper against the plate. An inking ribbon is disposed between the paper and the plate so that the pressure applied to the paper by the pressure roller causes the identifying and informative information contained on the plate, as well as the user's selected sponsor's name and products to be printed on the paper.

Upon movement of the slides to the forward limiting position, the pressure roller will have traversed the entire length of the type plate. Upon subsequent rearward movement of the slides, in the manner previously described, the pressure roller is raised out of pressurized engagement with the type plate and retracted with the slides. During initial rearward movement of the slides, additional feed rollers are rotated to advance the web through the forward slot in the machine housing to a position wherein one edge of the form to be issued overlies a cutting blade. Feeding of the web is then momentarily terminated and the cutting blade is raised to sever the printed form from the remainder of the web. Continued rearward movement of the slides to their rear limiting positions then causes final advancing of the web to position the leading portion thereof in readiness for the next printing operation.

Upon movement of the slides to the rear limiting positions, switch means are operated for energizing a solenoid to move the camming block slide bar to position the camming blocks thereon under the slide supporting rollers for elevating the slide in readiness for the next cycle of operation. Operation of the drive motor is also terminated to complete the cycle of operation.

The invention provides various operative elements and mechanisms which operate with the basic mechanism, briefly described above, to produce a practical and novel vending machine for printing chance selected indicia on game charts or coupons, and thereafter dispensing the chart or coupon.

A better understanding of the invention may be had from the following detailed description thereof, taken in connection with the annexed drawings, wherein:

FIGURE 3 is an enlarged side elevation, partially in section, of the mechanism contained within the housing of FIGURE 1;

FIGURE 3A is an enlarged detail of the area encircled by the arrow 3A in FIGURE 3;

FIGURE 4 is an enlarged detail, in section, of the area encircled by the arrow 4 in FIGURE 3;

FIGURES 5, 6 and 7 are enlarged, partial views, of one of the slides embodied in the mechanism of the machine, the slide being shown in three progressive positions of operation;

FIGURES 8 and 9 are large details of certain perforating and cutter blade actuating mechanism embodied in the present machine;

FIGURE 11 is an enlarged view in perspective of one of the printing wheels embodied in the present machine;

FIGURE 12 is a view, partially in section, of one of the printing wheels embodied in the present machine, and a portion of another wheel illustrating the ball detent indexing means which interconnect adjacent wheels;

FIGURE 13 is an enlarged section taken along line 13—13 of FIGURE 12;

FIGURE 14 is an enlarged view in perspective of one of the end printing wheels of the present machine;

FIGURE 15 is an enlarged view, in perspective, of the removable type forming the printing indicia on the wheels of FIGURES 11 through 14;

FIGURE 16 is an enlarged section taken along line 16—16 of FIGURE 5;

FIGURE 17 is an enlargement of the area enclosed by the arrow 17 in FIGURE 16;

FIGURE 18 is a section taken along line 18—18 of FIGURE 3A;

FIGURE 19 is a schematic view in perspective of the actuating means, operable by a user of the machine, to impart initial rotation to the printing wheels of the present machine;

FIGURE 19A is an enlargement of the area encircled by the arrow 19A in FIGURE 19;

FIGURE 20 is an enlarged section taken along line 20—20 of FIGURE 3;

FIGURE 21 is an enlarged view of perspective of the solenoid operated lift means for the inking roller counterweight embodied in the present machine;

FIGURE 22 is an enlarged front elevation, partially in section and broken away of a perforating and cutter blade mechanism embodied in the present invention, the blade being shown in its perforating position;

FIGURE 23 is a partial view, generally similar to FIGURE 22, showing the cutter blade in its cutting or severing position;

FIGURE 24 is an enlarged section taken along line 24—24 of FIGURE 3;

FIGURE 25 is a view of a sample coupon printed by the present machine;

FIGURE 26 is a schematic diagram of a motor control circuit embodied in the machine; and FIGURES 27–29 are schematic views illustrating certain sequential actions occuring during operation of the machine.

Figure 1:
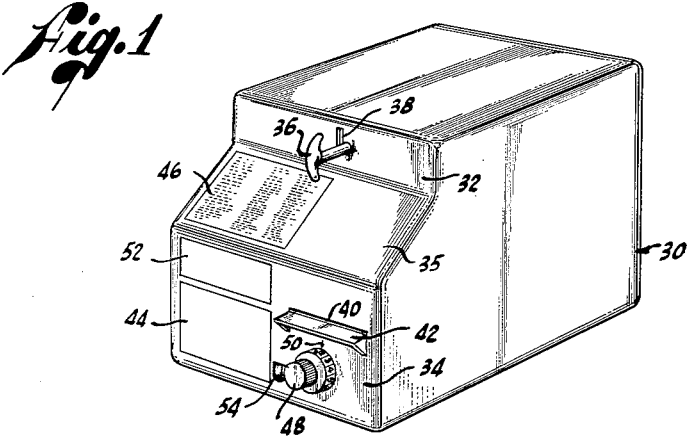
FIGURE 1 is a perspective view of the housing of the present vending machine.

As shown in FIGURE 1, the present vending machine comprises a housing 30 having a front panel including upper and lower vertical panel portions 32 and 34 and an intermediate inclined panel portion 35. Projecting forwardly of the housing 30 from the upper panel portion 32 is an actuating handle 36 which, after insertion of a coin or coins into a coin slot 38, is pulled by a user of the machine to initiate the operation of the latter.

As hereinafter described, the machine is operable in response to pulling of the handle 36 to print a coupon of the character illustrated in FIGURE 25, perforate the coupon, as shown in that figure, sever the coupon from a web of paper contained within the machine and thereafter dispense the printed coupon through a slot 40 in the lower panel portion 34 of the housing. A ledge 42, preferably of transparent material, is attached to the lower panel portion 34 to support the leading edge portion of the coupon as it is dispensed from the machine. The lower panel portion 34 is preferably provided with a plaque 44 containing instructions for operating the machine.

As preliminarily discussed, one of the uses of the present machine is in connection with an advertising scheme and in such cases the machine is subscribed to or sponsored by various companies whose products are sold in the particular establishment where the machine is located. In such uses of the machine, the coupon, illustrated in FIGURE 25, which is printed and dispensed by the machine is separated by a row of perforations P into two detachable sections identified in the latter figure by the letters A and B.

Section A constitutes an exchange coupon which the user of the machine turns in at the establishment where the machine is located in exchange for merchandise having a purchase price totaling or substantially totaling the denomination of the coin or coins inserted into the machine. The portion B of the coupon, comprising a game chart containing the chance selected indicia generally indicated at C, is retained by the purchaser for use in determining whether or not he or she is a winner in a subsequent drawing. The results of this drawing may be published in papers, periodicals and the like, as will be hereinafter more fully discussed.

The primary advertising value or advantage of the present vending machine arises from the fact that the purchaser, in accordance with the instructions 44 and before operation of the actuating handle 36, selects the name of one of the sponsors of the machine whose product or products he wishes to receive in exchange for the exchange coupon A. To this end, a list of the sponsors or supporters of the machine and numbers identifying each is preferably displayed on a plaque 46 mounted on the inclined panel portion 35 of the housing 30. In accordance with instruction 44, the purchaser notes the number beside his selected sponsor's name. He then manipulates a dial 48, on the lower panel portion 34 of the housing, to bring the selected sponsor's number into registry with an indicating mark 50 on the panel portion 34. As will be hereinafter described, this operation positions a printing wheel within the housing for printing in box D of the exchange coupon A in FIGURE 25, a list of the products for which the exchange coupon A may be exchanged, and in box E of the purchaser retained portion B of the coupon, the selected sponsor's name. The various other informative identifying information shown is also printed on the coupon during operation of the machine, as will be discussed. The panel portion 34 of the housing 30 may also mount a plaque 52 containing the necessary license or licenses for operating or possessing the machine.

Thus, briefly recounting the operation of the machine, the purchaser first selects a desired sponsor's name, sets the dial 48 to correspond with the selected sponsor, inserts the proper coin or coins into the coin slot 38, and finally pulls on the operating handle 36 to initiate operation of the machine. The machine is thereby rendered operative to print the coupon of FIGURE 25 and dispense the latter to the purchaser through the slot 40 in the machine housing. Spurious and superfluous coins are returned to the purchaser through a coin return slot 54.

As shown in FIGURE 3, the operating mechanism of the machine, contained within the housing 30 of FIGURE 1, comprises, briefly, seven basic assemblies or mechanisms, namely, the chance selection printing wheel and actuating assembly 100, inking assembly 200 which cooperates with the printing wheel mechanism 100 for printing the chance selected indicia on a web of paper furnished by a paper supply assembly 300, a drive assembly 400 for accomplishing printing of the chance selected indicia as well as operation of a web perforating and shearing assembly 500, a second printing assembly 600, which operates to print on the coupon the various informative and identifying information illustrated in FIGURE 25, and a final web feed assembly 700 which is operable to finally intermittently advance the web in a manner hereinafter described.

These various basic assemblies or mechanisms of the present machine will, for the sake of clarity, be described as to structure in the order listed above. The final description of operation of the machine will set forth the unitary cyclic operation performed by these several cooperating assemblies.

*Chance selection printing wheel and actuating assembly*

Figure 2:
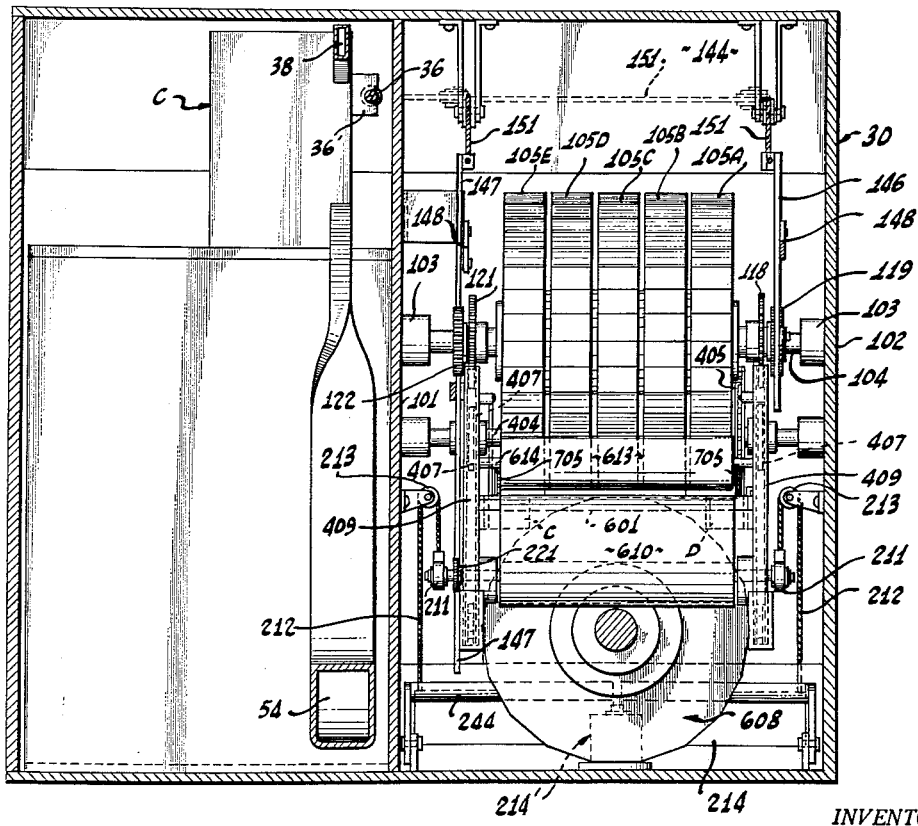
FIGURE 2 is an enlarged elevational view of the machine of FIGURE 1 with the front panel of the housing omitted to expose the internal mechanism of the machine.
Figure 10:
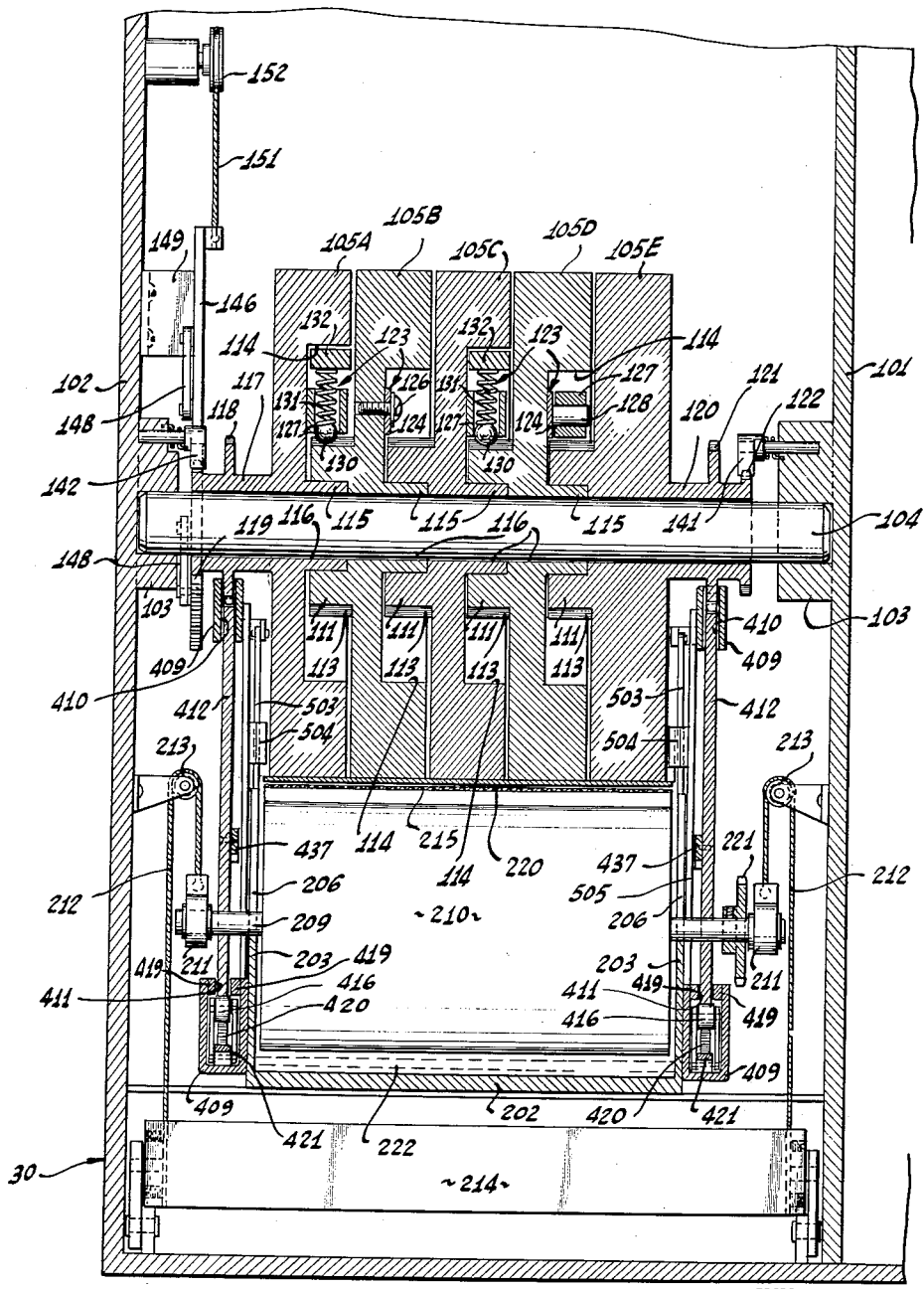
FIGURE 10 is an enlarged section taken along line 10—10 of FIGURE 3.

The above-identified assembly will be described with reference primarily to FIGURES 2, 3, 10 through 15 and 19. Referring first to FIGURES 2 and 10, the housing 30 of the machine has an internal, vertical supporting wall 101 which is rigidly joined along its upper and lower edges to the top and bottom panels of the housing 30. This wall 101 extends normal to the front and rear panels of the housing 30 and is spaced from the right hand panel 102 of the housing, as viewed in FIGURE 2, to form a space in which the several above-listed assemblies or mechanisms are located.

The inner surfaces of the supporting wall 101 and the panel 102 have inwardly extending, centrally bored bosses 103 which receive opposite ends of a printing wheel supporting shaft 104. Journalled on this shaft 104 are five printing wheels 105A through 105E.

The intermediate printing wheels 105B, 105C and 105D are identical and each defines about its periphery a series of 26 printing sectors, identified in FIGURE 11 by the numeral 106. Each of these printing sectors is formed with upstanding type conforming to certain preselected indicia such as the numbers and letters shown. Although these indicia are shown in FIGURE 11 as being formed directly on the printing wheels, they are preferably formed on removable inserts 107, 108 and 109, as illustrated on FIGURE 15. These inserts comprise rectangular cylindric portions formed with the indicia, as shown, and radially extending pins 110 which are tightly received in openings formed in the peripheries of the wheels. The inserts of FIGURE 15 permit changing of the indicia on the wheels in accordance with a particular contest or game in which the machine is used.

The left hand side of each of the three intermediate printing wheels 105B, 105C and 105D, as viewed in FIGURE 10, which is the forward side of the wheel, as seen in FIGURE 11, is formed with a central, axially extending hub 111. The periphery of each of these hubs is serrated to provide alternate grooves 112 and teeth 113. Each hub has 26 grooves 112, each groove being angularly aligned with one of the 26 printing sectors 106 on the wheel.

The other face of each of the intermediate printing wheels 105B, 105C and 105D is formed with a circular recess 114 (FIGURES 10 and 12). A central, axially extending bearing hub 115 extends from the bottom of this circular recess coaxial with a bore 116 extending axially through the wheel.

The left hand printing wheel 105A, as viewed in FIGURE 10 (the right hand wheel as viewed in FIGURE 2), is generally similar to the printing wheels just described, differing from the latter in that the serrated hub 111 on the intermediate printing wheels is replaced on the printing wheel 105a by a hub 117 somewhat reduced in diameter relative to the serrated hubs 111. Hub 117 is centrally formed with a first relatively large gear 118 and terminally formed with a second diameter gear 119. These gears may be seen most clearly in FIGURE 14.

The right hand printing wheel 105E, as viewed in FIGURE 10 (the left hand wheel as viewed in FIGURE 2), differs from the three intermediate wheels above described, in that its right hand face, as viewed in FIGURE 10, is not recessed and is formed with a central, reduced diameter hub 120 identical to hub 117 and including a central enlarged gear 121 and a terminal, reduced diameter gear 122 identical to gears 118 and 119 on the hub 117.

Positioned within the circular recess 114 in each of the first four printing wheels 105A, 105B, 105C and 105D is a spring-pressed ball detent assembly generally indicated at 123 in FIGURE 12. These detent assemblies 123 are identical and each comprises an arcuate mounting plate 124 longitudinally formed with a pair of arcuate slots 125 which receive screws 126 threaded into the respective printing wheel 105 for attachment of the mounting plate 124 to the printing wheel. It will be observed that the mounting plate 124 may be angularly adjusted about the axis of the printing wheel as a center by loosening of the attaching screws 126. An arcuate arm 127 is formed with a bore at one end which receives a pin 128 at one end of and extending normal to the mounting plate 124 for pivotal connection of the arcuate arm 127 to the mounting plate 124.

The opposite end of the pivotal arm 127 has a bore 129 extending therethrough along a radius of the arc to which the arm 127 conforms. Slidably positioned in one end of this bore 129 is a ball 130 which is resiliently biased into engagement with the serrated hub 111 on the adjacent printing wheel by a small coil spring 131 acting between the ball 130 and a pivotal adjusting arm 132. Arm 132 is disposed in a cut-out 133 in the rim on the printing wheel 105, defined by the circular recess 114, and is pivotally attached at 135 to this rim, with its outer face flush with the end face of the rim.

An angularly adjustable eccentric 136, located in a recess 137 in the rim of the printing wheel, bears against the free end of the adjusting arm 132 and is adapted to be angularly adjusted to rock the arm 132 and thereby vary the pressure exerted by the spring on the ball 130. The eccentric 136 is formed with a reduced, threaded extension 138, FIGURE 13, receiving a lock nut 139. Nut 139 is recessed in the opposite face of the printing wheel, as shown, and formed with a hexagonal socket 140 for receiving an Allen wrench or the like for clamping of the eccentric 136 in adjusted position.

The several ball detent mechanisms 123 and their adjacent serrated hubs 111 form releasable indexing means interconnecting the five printing wheels 105A through 105E. The balls 130 are located to releasably position the five printing wheels with their printing sectors aligned. During operation of the machine, as hereinafter described, rotation in opposite directions is imparted to the two end printing wheels, 105A and 105E, by operation of the handle 36. The three intermediate wheels 105B, 105C and 105D are thereby rotated in one direction or the other by driving engagement of the spring-pressed detent on each of these wheels with the serrated hub on an adjacent wheel. The directions of rotation of these three intermediate wheels is dependent on the compression of the spring 131 in each of the detent assemblies. This tension may, as described above, be adjusted by means of the rotary eccentric 136. The indexing means thereafter operate to gradually bring the five printing wheels to rest with respect to one another with their printing sectors aligned.

To assure the five printing wheels coming to rest with aligned printing sectors on the five wheels in proper printing position relative to the web of paper on which the indicia are printed, each of the reduced gears 119 and 122 on the two end printing wheels 105A and 105E are engaged by spring pressed pawls 141 and 142, respectively, (FIGURE 19) mounted on the hubs 103 of the supporting wall 101 and side panel 102 of the housing 30. Each of the gears 119 and 122 comprise 26 teeth so as to form in each of the gears 26 interstices into which the pawls 141 and 142 may engage. These spring pressed pawls exert a restraining action on the two end printing wheels tending to bring them to rest after initial rotation has been imparted thereto, as above mentioned. Moreover, the interstices between the teeth of the gears are angularly aligned with the 26 printing sectors on the printing wheels, and pawls 141 and 142 are so located that in the final rest position of the printing wheels, aligned printing sectors on the five printing wheels will be in printing position. This printing position is located along the lower intersection of a vertical plane, passing through the axis of the supporting shaft 104, with the peripheries of the wheels.

It will be apparent from what has been said above that the five printing wheels are brought to rest, with five printing sectors on the wheels aligned and located in the aforesaid printing position. Moreover, it will be apparent that the printing wheels are brought to rest in chance fashion so that the indicia in these five printing sectors are chance selected.

As previously briefly mentioned, operation of the machine is initiated by actuation of the operating handle 36 by the user of the machine who will pull the handle to the left, as viewed in FIGURE 3. This operation of the handle 36 imparts counter directions of rotation to the end printing wheels 105A and 105E, as will now be described.

Operating handle 36 comprises a cylindrical shaft having a reduced rear portion 143 defining an annular shoulder 144 engageable with the front panel of the housing 30 for limiting rearward movement of the operating handle 36 to the normal inoperative position shown in FIGURE 3. Handle 36 is releasably latched in this inoperative position by a latch 36' in a conventional coin control mechanism C. Latch 36' is released, to permit operation of handle 36, by insertion of the proper coin or coins into the machine.

Handle 36 is biased to and normally retained in inoperative position by a coil tension spring 145 attached at one end to the rear end of the operating handle and at the other end to a supporting wall 145a, depending from the upper panel of the housing 30.

Indicated as 146 and 147 are a pair of vertically movable racks located at opposite ends of the printing wheel supporting shaft 104. Rack 146 is vertically movable in the plane of the gear 119 on the printing wheel 105A while rack 147 is vertically movable in the plane of the gear 122 on the printing wheel 105E.

Rack 146 is supported for vertical movement in its plane by a pair of parallel links 148 pivotally attached at one end to the rack and at the other end to a bracket 149 which is secured to the right hand panel 102 of the housing 30. Rack 147 is similarly supported for vertical movement in its plane by a second pair of parallel links 148 pivotally attached at one end to the rack 147 and at the other end to a second supporting bracket 149 which is secured to the internal supporting wall 101 of the housing.

Rack 147 is provided at its lower end with a set of spring biased, ratchet teeth 150, shown most clearly in FIGURE 19A. Rack 146 is provided with a similar set of spring biased ratchet teeth 150. In the upper and lower limiting positions of the rack 146, which positions are identified as U and L, respectively, in FIGURE 3, its teeth 150 are disengaged from gear 119. During upward movement of the rack from its lower to its upper position, however, it passes through an intermediate position I wherein its teeth 150 engage the gear 119 to rotate the printing wheel 105A in a clockwise direction, as viewed in FIGURE 3. The teeth 150 ratchet upwardly during subsequent downward movement of the rack so as to not clash with those of the gear 119.

Similarly, the spring biased ratchet teeth 150 on rack 147 engage the gear 122 on the printing wheel 105E, during upward movement of the rack, to rotate the latter wheel in a counterclockwise direction as viewed in FIGURE 3. During subsequent downward movement of the rack 147, its teeth ratchet upwardly so as to not clash with those of the gear 122.

Attached to the upper end of each of the racks 146 and 147 is a cable 151 which extends over a series of pulleys 152 (FIGURES 2, 10 and 19), supported on the housing 30, to a transverse plate 153 on the rear end of the operating handle 36. As shown most clearly in FIGURE 19, the pulleys 152 are so arranged that the racks 146 and 147 are moved upwardly to rotate the end printing wheels 105A and 105E in the opposite directions noted, when the handle 36 is pulled forwardly by a user of the machine. The racks are returned to their lower positions, when the handle is released, by springs 154 secured to the lower ends of the racks. Spring 145 returns handle 36 to its normal position. Rack 147 is somewhat longer than rack 146 and is provided at its lower end with a second set of spring biased ratchet teeth 155, identical to teeth 150, for reasons to be presently described.

From the description thus far, it will be apparent that when the handle 36 is pulled, rotation, in opposite directions, is imparted to the end printing wheels 105A and 105E. The intermediate printing wheels 105B, 105C and 105D are rotated, in one direction or the other, from the end printing wheels, owing to the interconnection of adjacent wheels by the several ball detent indexing mechanisms 123.

As previously discussed, the five printing wheels are gradually brought to rest by the restraining action of these indexing mechanisms, as well as by the restraining action of the two indexing pawls 141 and 142 which engage the gears 122 and 119 on the end printing wheel 105A and 105E. As previously discussed, the five wheels will come to rest with the printing sectors 106 of the five wheels aligned and with one sector of each wheel in the aforementioned printing position. The wheels are thus brought to rest in chance fashion so that the indicia contained in the latter sector of each wheel is chance selected.

*Inking assembly*

The inking assembly 200 will be described by reference to FIGURES 2–6, 10 and 21. Referring first to FIGURES 3 and 10, the inking assembly comprises a hollow ink well 201 defined by a bottom wall 202, vertical end walls 203, (FIGURE 10) and front and rear walls 204 whose upper extremities curve over the bottom wall 202. These walls 204 define at the top of the well an opening 205 which extends from one of the end walls 203 to the other, the end walls being vertically slotted at 206 (FIGURE 10) in alignment with this opening 205. The well 201 is slightly longer than the total axial length of the five printing wheels, as may be observed most clearly in FIGURE 10.

As shown most clearly in FIGURE 3, the well 201 is supported a distance above the bottom wall of housing 30 by a pair of supporting walls 207 and 208, the latter of which forms a portion of the rear side wall of the well. The well is positioned with its end wall slots in a vertical plane passing through the axis of the printing wheel support shaft 104.

Positioned within the well, and having a central shaft 209 projecting at opposite ends beyond the well end walls 203 through the slots 206 therein, is an inking roller 210. Roller 210 is made of some suitable material such as hard rubber. Opposite ends of the inking roller shaft 209 are journalled exteriorly of the well 201 in a pair of ballbearing hangers 211 (FIGURE 10).

Hangers 211 are affixed to a pair of cables 212 which extend upwardly from the hangers, over a pair of pulleys 213, supported on the side panel 102 and internal supporting wall 101 of the housing 30, and thence downwardly to a counterweight 214 to which the lower ends of the cables are attached. Counterweight 214 is located in and capable of limited vertical movement in the space between the bottom wall 202 of the ink well 201 and the bottom wall of the housing 30.

The weight of the inking roller 210 is substantially less than that of the counterweight. The roller 210, therefore, tends to be raised in the well 201 by the counterweight. If the counterweight is raised, however, the inking roller will be lowered under its own weight. The counterweight is raised and lowered during operation of the machine, to accomplish raising and lowering of the inking roller in this fashion, as will be presently described, by controlled energization of a solenoid mechanism 214' (FIGURES 3 and 21).

Positioned over the upper opening 205 in the ink well 201 is a silk screen 215 (FIGURE 3) having a width equal to that of the well. Attached to the forward end of this screen is a small weight 216 which tends to pull the screen downwardly along the forward wall of the well.

The other end of the screen passes over a guide roller 217 and thence downwardly to a spring wound drum 218 around which a length of screen is wound. The bias of the drum 218 is such as to wind the screen thereon and draw the screen 215 rearwardly. Rearward movement of the screen is limited, to the position shown in FIGURE 3, by stop means 219.

In operation of the device, to be hereinafter more fully described, the inking roller is raised in the well 201 to press the screen 215 against a web 220 of paper (on which the dispensed coupons are printed as will be shortly described) which is interposed between the screen 215 and the printing wheels 105. The web is, in turn, pressed against the peripheries of the five printing wheels. The inking roller 210 has a thin layer of ink on its surface, as discussed below, which ink is filtered by the silk screen 215. The filtered ink passing through the screen is deposited on the high points of the impressions formed on the underside of the web of paper 220, owing to the pressure of the web against the type (FIGURES 11, 14 and 15) on the peripheries of the printing wheels. The indicia of the type is thereby printed on the underside of the web.

To the end that the inking roller will have a thin layer of ink during this printing operation, the right hand end of the roller shaft 209 mounts a gear 221 in the plane of rack 147 (see FIGURE 19). Teeth 155 on the rack 147 are located for engagement with this gear 221 during upward movement of the rack by operation of handle 36, to spin the inking roller 210 in the bath of ink 222 contained in the ink well 201. The teeth 155, being identical to the ratchet teeth 150, FIGURE 19A, ratchet upwardly during downward movement of the rack to avoid clashing of teeth 155 with those of the gear 221.

During this initial spinning of the inking roller, a layer of the ink 222 adheres to its surface. Excess ink is removed by a roller 223 (FIGURE 3) journalled on a pair of arms 224 (only one shown) pivoted on the rear ink well wall 204. These arms are biased forwardly to press roller 223 against the periphery of the inking roller 210 by springs 224'.

In order to maintain the ink 222 in well 201 at a constant, predetermined level, below the lower ends of slots 206 in the well end walls 203, a removable reservoir 225 is provided. Reservoir 225 comprises a container 226 with a removable, air tight lid 227. Vertically movable in the container is a float, or piston 228 which rides on and drops with the ink in the container.

Adjacent the lower end of the container 226 is a spout 229 (FIGURE 4) which is slidably receivable in an opening 230 in the supporting wall 208. It will be recalled that wall 208 forms a portion of the rear wall of the well 201. Opening 230 opens into the well. Bridging the inner end of this opening is a bar 231 which intersects an opening 232 in a plate 233. Plate 233 is fixed to the inner surface of a boss 234 on the wall 208 about the opening 230 therein. Opening 232 is registered with opening 230, as shown.

Spout 229 is removable from the opening 230 to permit removal of the container 226 from the housing 30 for purposes of replacement or refilling when empty. The spout 229 encloses a ball check valve device 235 to prevent leakage of ink from the container when the latter is removed from and inserted in the housing. This ball check device includes a stem 236 engageable with the bar 231, when spout 229 is inserted in opening 230, for unseating the ball of the device to permit the flow of ink from the container 226 to well 201.

It will be apparent that since the top of the container 226 is sealed by the lid 227, the level of ink 222 maintained in the well will be lower than the ink level in the container. The spout 229 is so vertically positioned that the ink level in the well will be below the lower ends of the well end wall slots 206, as previously mentioned.

Container 226 is supported on a horizontal plate 237 fixed to the supporting wall 208. In order that personnel in the establishment wherein the machine is located may be made aware of a low ink supply in the machine, a switch 238 is affixed to the bottom of the container 226. This switch is actuated, to energize a bell 239, or other suitable warning means, by dropping of float 228 into engagement with the actuating element 240 of the switch. This element projects upwardly through the bottom of the container, as shown. Shelf plate 237 is slotted, as shown, to provide clearance for switch 238 so as to permit removal of the container 226 from the shelf. The electrical lead from switch 238 to bell 229 has a detachable connector 241 to accommodate this removal of the container for replacement or refilling.

*Paper supply*

The web 220 of paper, which is preferably so-called safety paper, is received from a roll 301 in the paper supply 300 (FIGURE 3). Roll 301 is supported on a shaft 302, journalled at opposite ends in a pair of upstanding, slotted bearing supports 303.

Web 220 unwinds from the upper periphery of the roll 301 and feeds through a guide chute 304 formed by a pair of vertically spaced, horizontal plates fixed to the ink well supporting wall 208. During operation of the machine, to be described, the web 220 is fed, in the plane of the guide chute 304, between the printing wheels 105 and inking screen 215, through the final web feed assembly 700, the perforating and cutting blade assembly 500, the final printing assembly 600, and finally out the exit slot 40 in the front panel of the housing 30.

To indicate a low paper supply in the machine, any conventional indicating means, such as that illustrated at 305 may be employed.

*Drive assembly*

As initially mentioned, operation of the present machine to print and dispense a coupon of the character illustrated in FIGURE 25 is initiated by pulling of the handle 36. The manner in which the printing wheels 105 are rotated, for chance selection of indicia thereon, has been discussed. To the end of printing on the web 220 the chance selected indicia contained in four successive printing segments of each printing wheel, to provide the four rows of indicia c on the coupon of FIGURE 25, and dispensing of the printed coupon as well as the hereinafter described perforating, printing, and shearing operations, the drive assembly 400 is provided.

This drive assembly comprises a drive motor 401 which is initially energized by operation of a timing switch 402. As shown most clearly in FIGURE 3, timing switch 402 includes an actuating arm 403 which is actuated by handle 36 when the latter is pulled forwardly from its inoperative position. This actuation of the arm 403 conditions the timing switch 402 for operation. As previously noted, handle 36 is releasably latched in its inoperative position and cannot be pulled to actuate timing switch 402 until the proper coin or coins have been inserted in the coin slot 38.

A preset interval of time after this actuation of the time switch, the latter completes an energizing circuit (see FIGURE 26) to the motor 401 and the latter commences to drive. The timing switch may comprise any conventional timing switch which will operate in this delayed fashion to momentarily energize the motor 401 as hereafter discussed. The timing switch is so adjusted or preset that the delay between its actuation and energizing of the motor 401 is sufficient to assure the printing wheels 105 having been brought to rest. In view of what has been said, it is clear that these wheels are rotated and the timing switch is actuated by operation of handle 36.

Motor 401 drives a shaft 404 (FIGURE 3) through a chain drive 405, shaft 404 being journalled in a support, not shown. Shaft 404 extends parallel to the printing wheel shaft 104 and mounts a pair of gears 407 (FIGURE 2) at its ends. Located in the planes of these gears, parallel to the supporting wall 101 and side 102 of housing 30 and at opposite sides of the several assemblies 100, 200, 300, 500, 600 and 700 are a pair of reciprocable operating or control slides 408. These slides are guided for forward and rearward movement in the housing 30 by open, rectangular guide frames 409 rigidly secured at their forward ends to the front panel of the housing 30 and at their rear ends to a vertical supporting plate 409a (FIGURE 3) rigid on the bottom panel of the housing. As shown most clearly in FIGURE 10, these frames define upper and lower longitudinal tracks or guideways 410 and 411 which receive the upper and lower longitudinal edges of the slides 408 for guiding the latter in their forward and rearward movement.

The two slides 408 and two guide frames 409 are substantially identical, being mirror images of each other. Accordingly, only one of each will be described in detail, namely, that slide and frame which are located at the left hand side of the machine, as viewed in FIGURE 10 (the right hand side, as viewed in FIGURE 2). This left hand slide and guide frame are shown in FIGURES 5-7.

Slide 408 in FIGURES 5-7 comprises a plate 412 having a longitudinal rectangular opening 413, the upper edge of which is formed with rack teeth 414. The lower edge of the opening is formed with rack teeth 415. The gear 407 on the right hand end (as viewed in FIGURE 2) of the driving shaft 404, as previously noted, is disposed in the plane of the control slide 408 of FIGURES 5-7 and is located in the opening 413, as shown. The diameter of the gear 407 is slightly less than the vertical spacing between the tips of rack teeth 414 and 415 so as to not engage both sets of rack teeth simultaneously. Slide 408 is shown, in FIGURE 5, in the normal position it occupies prior to operation of the machine. In this normal position, gear 407 engages the lower teeth 415 on the slide 408.

Slide 408 is releasably supported in this position, hereinafter referred to as the upper position of the slide, by a series of rollers 416 positioned within the lower track 411 of the guide frame 409 (see FIGURES 16 and 17). The lower edge of the slide plate 412 bears on these rollers. Rollers 416 are journalled on the upper ends of and between pairs of links 417. Links 417, in turn, straddle are are pivoted to a series of upstanding projections 418 rising from the bottom wall of the lower track or guideway 411 of the guide frame 409. As shown most clearly in FIGURES 16 and 17, the side faces of the projections 418 are spaced from the side walls of the lower track 411 to accommodate the links 417.

The rollers 416 and links 417 are adapted for pivoting, in the plane of the slide plate 412, from their elevated positions of FIGURES 5 and 6, to the depressed positions of FIGURE 7. In the elevated positions of the rollers 416, the slide 408 is supported in its upper position of FIGURES 5 and 6. When the rollers are lowered to their position of FIGURE 7, the gear 407 on drive shaft 404 engages the upper teeth 414 on the slide.

The vertical dimension of the guide frame 409 is sufficient to accommodate this vertical movement of the slide and the side walls of the upper and lower tracks 410 and 411 of the guide frame are sufficiently vertically extended as to guide the slide therebetween in both the upper and lower positions of the latter. The side walls of the lower track 411 have bearing strips 419 (see FIGURE 17) affixed to their inner surfaces for bearing against the slide plate 412.

Returning now again to FIGURES 5-7, the rollers 416 are releasably supported in their elevated positions by a series of cam blocks 420 fixed to a slide bar 421. Slide bar 421 is slidably supported on the projections 418 for longitudinal movement from the rear position of FIGURES 5 and 6 to the forward position of FIGURE 7. A pair of bearing pins 422 retain the slide bar 421 against upward movement.

In the rear position of the slide bar 421, the cam blocks 420 support the rollers 416 in their elevated position so that slide 408 is supported in its upper position. When the slide bar 421 is moved to its forward position, the cam blocks 420 are retracted from below the rollers 416 so that the latter drop to their depressed position and the slide 408 drops to its lower position of FIGURE 7. The inclined rear faces on the cam blocks cam the rollers and, therefore, the slide 408 to their upper positions when the slide bar 421 is again moved to its rear position of FIGURES 5 and 6.

Forward movement is imparted to the slide bar 421, during operation of the machine, by engagement of the forward edge of the slide 408 with an upstanding arm 423 on the forward end of the slide bar. Rearward movement is imparted to the slide bar 421 by energizing of a solenoid 424 whose plunger 425 (FIGURE 7) is attached to an upstanding arm on the rear end of the slide bar.

Solenoid 424 is energized by closure of normally open contacts 426A (FIGURE 26) in a switch 426 mounted at the upper, rear end of the frame guide 409. The actuating arm 427 of this switch projects through a cut out in the frame for engagement with the upper edge of the slide 408 when the latter is moved to its rear position. This engagement of the slide with the switch arm 427 closes switch contacts 426A to energize solenoid 424 and move the slide bar 421 rearwardly.

Operation of the drive assembly, thus far described, is as follows. Prior to operation of the machine, slide 408 in FIGURES 5-7, and other described parts of the assembly, occupy the positions of FIGURE 5. Upon initial energizing of drive motor 401 (FIGURE 3) by operation of the timing switch 402, in the manner previously discussed, motor 401 drives in a direction to rotate gear 407 in FIGURE 5 in a clockwise direction. Since this gear is engaged with the lower teeth 415 on the slide 408, the latter is driven forwardly through the position of FIGURE 6 to the forward position of FIGURE 7.

Timing switch 402 is of a type which closes only momentarily and reopens, after a preset interval of time. As shown in FIGURE 26, however, timing switch is in parallel with a set of contacts 426B in the slide actuated switch 426. These latter switch contacts 426B are open when the switch arm 427 engages the slide 408, as in FIGURE 5, and are closed upon forward movement of the slide 408 out of engagement with the switch arm 427. Timing switch 402 is preset to maintain motor 401 energized sufficiently long to assure driving of slide 408 out of engagement with the arm 427 of slide switch 426. It is apparent, therefore, that the driving motor 401 is initially energized through the timing switch 402, and that energizing of the motor, after reopening of the timing switch, is maintained through the slide switch contacts 426B.

Slightly before the slide 408 reaches its forward position, the forward edge thereof engages arm 423 on slide bar 421 and the latter is moved forwardly with the slide 408 to its forward position of FIGURE 7. The camming blocks 420 are thereby retracted from below the slide supporting rollers 416. The latter, together with the slide 408 thus drop to their positions of FIGURE 7. Gear 407 now engages the upper teeth 414 on the slide 408. The slide is, therefore, driven rearwardly to its rear position of FIGURE 5, owing to the continued rotation of gear 407 in a clockwise direction.

Upon the slide 408 reaching its rear position, it engages the actuating arm 427 of switch 426 to close its contacts 426A. Solenoid 424 is thereby reenergized to move the slide bar 421 to its rear position with resultant camming of the rollers 416, and therefore slide 408, to their upper positions (FIGURE 5).

Motor contacts 426B in the slide switch 426 are simultaneously reopened to de-energize the drive motor and terminate one operating cycle of the slide.

As previously noted, the right hand slide 408, as viewed in FIGURE 10, its guide frame 409, and parts associated therewith are substantially identical to the guide frame and slide arrangement just described, except that the slides and frames are mirror images.

Accordingly, during driving the motor 401, this right hand slide is moved through an operating cycle simultaneously with and identical to the operating cycle, just described, of the left hand guide 408.

As will shortly be described, the inking roller 210 exerts upward forces on the two slide plates 412 during forward movement of the latter. These upward forces tend to rock the slide plates about the two driving gears 407 as a pivot, as will be evident from the forward location of the inking roller shaft 209 relative to the gears 407, as shown most clearly in FIGURE 5. This rocking of the slide plates 412 is, however, prevented by engagement of the lower edges of the slide plates with their supporting rollers 416. The upward forces exerted by the inking roller on the slide plates 412 serve to hold the lower rack teeth 415 on the slide plates in full meshing engagement with the teeth of the gears 407. It will be apparent, however, that these upward forces exerted on the slide plates would inhibit dropping of the latter, at the forward limits of the strokes thereof, from their upper position of FIGURES 5 and 6 to the lower position of FIGURE 7.

To accomplish the removal of these upward forces at the forward limits of the strokes of the slide plates, the counterweight 214 is elevated by energizing of the solenoid mechanism 214', as described below, to permit dropping of the inking roller 210 under its own weight and therefore dropping of the slide plates. Solenoid assembly 214' (FIGURE 21) comprises a solenoid 242 having a plunger 243. The upper end of plunger 243 is connected to a horizontal shaft 244. Opposite ends of shaft 244 are pivoted to one end of a pair of rocker arms 245 which are pivoted, at an intermediate point thereof, to a pair of upstanding brackets on the bottom panel of the housing 30. The other ends of the rocker arms 245 are pivotally attached to opposite ends of the counterweight 214.

When solenoid 242 is deenergized, substantially the entire mass of the counterweight 214 is suspended by the cables 212 for biasing the inking roller 210 in an upward direction, as previously discussed. When solenoid 242 is energized, however, plunger 243 thereof is moved downwardly, as viewed in FIGURES 2, 3 and 21, to elevate the counterweight 214. The inking roller 210 is thereby permitted to move downwardly in the ink well 201 under its own weight. The distance which the counterweight 214 is elevated by energizing of the solenoid 242 is sufficient to accommodate dropping of the slide plates 412 from the position of FIGURE 5 to that of FIGURE 7.

Energizing of the solenoid is controlled by a switch 246 (see FIGURES 5 to 7) which is positioned to be actuated by initial forward movement of the left hand slide bar 421, shown in FIGURES 5 through 7. This actuation of the switch 246 is made to occur during initial forward movement of the slide bar 421, by the left hand slide plate 412, and prior to retraction of the camming blocks 420 on the slide bar from below the slide supporting rollers 416. The solenoid 242 is thereby energized to raise the counterweight 214 and allow dropping of the slide plates 412 in response to final forward movement of the slide bars 421 to their forward limiting position of FIGURE 7.

As discussed above, the slide plates 412 are now driven to their rear limiting position. Slide switch 246 will remain closed to maintain the counterweight solenoid 242 energized until reopened by rearward movement of the slide bar 421 resulting from movement of the slides 412 to their rear limiting position of FIGURE 5.

As discussed below, forward and rearward movement of the slide plates 412 serves to cause predetermined sequential operation of the printing wheel assembly 100, inking assembly 200, above described, as well as the three remaining assemblies, namely, the cutter blade assembly 500, final printing assembly 600, and the final web feed assembly 700. These assemblies are to be presently described in that order.

It is pointed out at this time, however, that to accomplish this sequential operation of the assemblies, the upper edges of the slide plates are relieved at 428 (FIGURES 5-7) and formed adjacent the forward ends of the slides with a series of four teeth 429. As will be described, these teeth 429 mesh with the teeth on the gears 118 and 121 of the end printing wheels 105A and 105E, during forward movement of the slide plates, to impart rotation to the printing wheels. To control elevating of inking roller 210 during the printing operation involving printing wheels 105, opposite ends of the inking roller shaft 209 are received in cam slots 430 formed in the slide plates 412. These cam slots 430 in the two slide plates are identical and comprise, as shown most clearly in FIGURES 5 through 7, a forward narrow portion 430a, a following wide portion 430b terminating in an inclined cam face 430c, and a final narrow portion 430d. The manner in which the cam slots 430 serve to control vertical movement of the inking roller will be further discussed in the description of the operation of the machine.

During initial forward movement of the slide plates 412 from their rear inoperative position of FIGURE 5, the perforating and cutting blade assembly 500 is operated to form the row of perforations P, FIGURE 25, in the web 220. To cause this initial perforating operation of the cutter blade assembly, the slide plates 412 are formed in their inner surfaces with projecting cams 431 located at the forward edges of the slide plates. These cams 431 have forward inclined cam faces 432 which serve to impart perforating movement to the cutter blade assembly, as will be described.

Cutter blade assembly 500 to also operated, on the return or rearward stroke of the slide plates 412, to sever the web of paper 220 for dispensing of one detached coupon of the character shown in FIGURE 25. To cause this severing operation of the cutter blade assembly, slide plates 412 have mounted on their inner surfaces a pair of pivoted cams 433, shown in detail in FIGURES 8 and 9. Cams 433 are located and operate, as described below, and include a rear inclined camming face 434. The cams 433 are pivoted at 435 for vertical swinging movement between the lower solid line position in FIGURE 8 and the upper phantom line position of that figure. Swinging movement of the cams 433 between these positions is limited by engagement of side edges of the cam 433 with a stop 436.

During the rearward stroke of the slide plates 412, the latter serve to advance the web of paper 220 immediately prior to and following the shearing operation, just mentioned, of the cutter blade assembly 500. To provide for this intermittent advancing of the web 220, slide plates 412 each have mounted on their inner surface, a pair of horizontally coplanar racks 437 and 438 which are spaced as shown. The cams 433, just mentioned, are located in a vertical plane passing between these racks 437 and 438 for reasons to be hereinafter more fully appreciated.

The drive assembly above discussed is completed by a pair of hook slots 439 formed in the forward edges of the slide plates 412. These hook slots 439 include forward depending hooks 440 and cooperate with the final printing assembly 600 to cause printing on the coupon of FIGURE 25 the various identifying and informative information shown.

*Perforating and cutting blade assembly*

The perforating and cutting blade assembly will be described with primary reference to FIGURES 3, 5 through 7 and 22 through 24. This assembly comprises a cutting and perforating blade 501 having a serrated perforating and shearing edge 502, as shown more clearly in FIGURES 22 through 24. Opposite ends of this blade are secured to a pair of vertical arms 503. Arms 503 are guided for vertical movement in a pair of generally U-shaped guide brackets 504 (see FIGURES 22 to 24) secured to vertical supporting plates 505, which, in turn, are secured at their upper and lower edges to the inner walls of the guide frames 409 so as to clear the cams 432 and 433 as well as the racks 437 and 438 on the inner surfaces of the slide plates 412.

The upper ends of the arms 503 are pivotally attached to, and intermediate the ends of, a pair of pivotal arms 506. As may be seen most clearly in FIGURES 5 through 7, 22 and 24, these pivotal arms 506 are pivoted at their forward ends to bosses 507, projecting inwardly from the guide frames 409. The arrangement is such that pivoting of the pivotal arms 506 from the solid line position of FIGURE 5 to the phantom position of that figure effects upward movement of the perforation and shearing blade 501 from its phantom line position in FIGURE 22 to the solid line perforating position of that figure. Arms 506 are limited in downward swinging movement to the solid line position of FIGURE 5 by a pair of stops 508 (only one shown) on the guide frames 409. The blade is biased downwardly by the spring shown in FIGURE 3.

Cooperating with the shearing and perforating blade 501 to perforate and shear the web 220 of paper, is a cutting bar 509. As shown in FIGURE 22, this cutting bar 509 is attached at opposite ends of the guide brackets 504 and has its rear face, as viewed in FIGURE 3, substantially in the plane of the forward face of the cutting blade 501. When the blade 501 is raised, the web of paper 220 is sheared between the blade 501 and the cutting bar 509.

As previously indicated, initial forward movement of the slide plates 412 causes operation of the blade assembly 500 to form the perforations P in the coupon. FIGURE 25. During this perforating operation, the blade 501 is elevated from its phantom line position in FIGURE 22 to its solid line position in that figure wherein the tips of the teeth of the cutting edge 502 of the blade pierce the web 220 to form the perforations.

To accomplish this limited upward perforating movement of the blade 501 in response to initial forward movement of the slide plates 412 in the drive assembly 400, the pivotal arms 506, which elevate the blade 501, are formed at their free rear ends with pins 510 which project outwardly from the arms into the paths of the cams 431 on the adjacent slide plates 412, as may be seen most clearly in FIGURE 24. These pins 510 are arranged to ride on the cam surfaces 432, of the cams 431 on the adjacent slide plates 412 during initial forward movement of the slide plates from their inoperative position of FIGURE 5. The arms 506 are thereby cammed upwardly to their phantom position in FIGURE 5 with the resultant elevating of the blade 501 to its solid line, perforating position of FIGURE 22. The upper side walls of the guide frames 409 are cut away to provide clearance for the pins 510, as shown. After the cams 431 on the slide plates have passed the pins 510 on the arms 506, the latter drop to their solid line positions and the perforating blade 501 returns to its lower position. The row of perforations P in the coupon of FIGURE 25 are thus formed in the web 220 of paper.

During the return or rearward stroke of the slide plates 412, the blade 501 is elevated to its shearing position of FIGURE 23 to shear the web of paper 220. It will be noted in FIGURE 23 that in the shearing position of the blade 501, the serrated cutting edge 502 of the blade cuts completely through the web of paper 220.

To accomplish this upward shearing movement of the cutter blade 501 during the return stroke of the slide plates 412, the blade 501 is provided at opposite ends with a pair of pins 511 which extend outwardly from the vertical blade supporting arms 503, through vertically elongated slots 512 in the cutter assembly support plates 505. These pins 511 terminate somewhat outwardly of the outer face of the supporting plates 505. When the slide plates 412 of the drive assembly 400 are in their upper position of FIGURES 5 and 6, pins 511 are located in horizontal planes passing directly below the cam stops 436 (FIGURES 8 and 9) on the slide plates. During forward movement of the slide plates, therefore, the cam stops 436 pass over the cutter blade pins 511 and the cams 433 are cammed upwardly to their phantom line positions of FIGURE 8 to permit passage of the cams 433 over the cutter blade pins 511.

When the slide plates 412 are in their lower position of FIGURE 7, during the return stroke of the slide plates, however, the cutter blade pins 511 are somewhat elevated relative to the cam stops 436 and cams 433, as illustrated in FIGURE 9. During this return stroke of the slide plates 412, the inclined cam faces 434 on the cams 433 operate to cam the cutter blade pins 511 upwardly and over the cams 433, as shown in FIGURE 9. Cutter blade 501 is thereby elevated from its lower phantom line position in FIGURE 23 to its upper shearing position in that figure to shear the web of paper 220. After the cam stops 436 move past the vertical plane of the cutter blade pins 511, the cutter blade 501 drops to its lower position.

During initial forward travel of the slide plates 412 in the drive assembly 400, the leading edge of the web 220 of paper will be located as shown in FIGURE 27, slightly forward of the perforating blade 501, so that the perforations are formed in the web along the line P spaced a distance D1 (FIGURE 25) from the leading edge of the web. Immediately after the pins 510 on the pivotal arms 506 of the cutter blade assembly have dropped behind the cams 431 on the slide plates 412 to complete the perforating operation just mentioned, the teeth 429 on the upper edges of the slide plates 412 are engaged with the gears 118 and 121 on the two end printing wheels 105A and 105E. Continued forward movement of the slide plates with the teeth 429 thus engaged with the printing wheel gears 118 and 121 imparts rotation to the latter a distance of four teeth corresponding to rotation of the printing wheels through four printing sectors.

During this latter travel of the slide plates 412, the inking roller shaft 209 becomes disengaged from the narrow forward portion 430A of the cam slots 430 in the slide plates and will be located in the wide portion 430B of the cam slots. As more fully discussed in the operation of the machine, engagement of the inking roller shaft 209 in the forward narrow portions 430A of the cam slots 430 retains the inking roller at its lower position out of pressurized engagement with the web of paper 220. Relative movement of the inking roller shaft 209 into the wide portion 430B of the cam slots 430 permits upward movement of the inking roller, under the action of the counterweight 214, to press the silk screen 215 and web of paper 220 against the peripheries of the printing wheels 105.

This elevating movement of the inking roller is timed to occur simultaneously with engagement of the first of the teeth 429 in the upper edges of the slide plates with the gears 118 and 121 of the printing wheels. Owing to pressurized engagement of the web of paper 220 against the printing wheels during the above described rotation thereof through four printing sectors, the web 220 is fed from the position of FIGURE 27 to that of FIGURE 28 wherein the leading edge of the web is located just slightly forwardly of the printing assembly 600.

Upon movement of the slide plates 412 to the position of FIGURE 6 wherein the printing wheels 105 have been rotated through four printing sectors, the inclined cam faces 430C of the cam slots 430 become engaged with the inking roller shaft 209 to cam the latter downwardly into cam slot portions 430D. The inking roller 210 is thereby moved out of pressurized engagement with the web of paper 220 to terminate advancing of the web. The inking roller 210 remains in its lower position against the action of the counterweight 214 by engagement of its shaft 209 in the rear narrow portions 430D of the cam slots 430.

*Final printing assembly*

The final printing assembly will be described with reference primarily to FIGURES 2, 3, 5–7, 22 and 24. The final printing assembly 600 comprises a type plate 601 (FIGURE 3) which is rigidly fixed in some suitable manner to the frame of the machine and extends to the forward panel thereof, as shown. Type, not shown, is formed in or set in the upper surface of the type plate 601 for printing on the coupon dispensed by the machine, the various informative and identifying information illustrated on the coupon of FIGURE 25. This type plate 601 is formed with a rectangular opening 602 through which projects the periphery of a printing wheel 603, as well as with openings (not shown) for receiving a dating mechanism D and a counter C for applying the date and a serial number to the coupon.

Printing wheel 603 is fixed on a shaft 604 which is journalled at one end at an upstanding bracket 604A fixed to the bottom panel of the housing 30 of the machine. The forward end of the shaft 604 is journalled in and extends exteriorly of forward panel portion 34 of the housing. Fixed on this extending end portion of the shaft 604 is the previously mentioned dial 48 which carries on its periphery a series of numbers 605 corresponding to the identifying numbers opposite the sponsors' names contained on the plaque 46 on the inclined panel portion 35 of the housing. Dial 48 has its rear face annularly recessed and formed with internal serrations 606 (FIGURE 20) which cooperate with a ball detent assembly 607, fixed to the forward panel 34 of the housing 30, to releaseably retain the dial 48 in a position wherein a selected one of the numbers 605 are aligned with the arrow 50.

As previously indicated, a user of the machine initially turns the dial 48 to align one of the numbers 605, corresponding to the selected sponsor's name, with the arrow 50. The printing wheel 603 actually comprises two separate, fixed printing wheels 608 and 609. Printing wheels 608 and 609 are divided into a plurality of printing sectors equal in number to the number of indicia 605 and the dial 48, and, therefore, the number of sponsors on the plaque 46. These printing sectors of the two printing wheels 608 and 609 are formed with type for printing in boxes E and D of the coupon of FIGURE 25, the selected sponsor's name and his products, respectively. The products will be contained on the printing wheel 608 while the sponsor's name will be contained in an aligned sector of the printing wheel 609. Thus, by turning the dial 48, the user may position the printing wheels 608 and 609 so that the printing sectors thereof, containing the selected sponsor's name and his products, are in printing position in the type plate opening 602. Overlying the type plate 601 and printing wheels 608 and 609, is an inking ribbon 610 which is wound at opposite ends on a pair of drums 611 and 612. The inking ribbon passes from the drums, through slots in the type plate, and over guide rollers, as shown, and is located between the type plate and the web 220 of paper. During operation of the printing assembly 600, the web of paper 220 will be positioned, as previously noted, in the position of FIGURE 28.

To accomplish printing of the information contained on type plate 601 and the uppermost printing sectors of the printing wheels 608 and 609 on the overlying portion of the web 220, a pressure roller 613 is moved forwardly over the type plate 601 and printing wheels 608 and 609 to press the web against the inking ribbon 610 and type plate. This pressure roller comprises a central shaft 614, opposite ends of which extend into cam or guide grooves 615. These guide grooves are of closed configuration as shown, and are formed by slots 616 in a pair of plates 617 fixed to the outer sides of the guide frames 409 of the drive assembly 400. Cooperating with the walls of the slots 616 to form the guide grooves 615 are central ribs 618 fixed to the plates 617.

The guide grooves 615 have an overall length slightly greater than the length of the type plate 601, as shown most clearly in FIGURE 3, and have a width slightly greater than the diameter of the pressure roller shaft 614 to permit movement of the shaft around the guide grooves. The lower edges of the central ribs 618 are so vertically located relative to the type plate 601 that when pressure roller 613 moves along the lower tracks of the guide grooves 615, it is pressed against the web of paper 220 to press the latter and the inking ribbon against the type plate and peripheries of the printing wheels 608 and 609.

When the slide plates 412 of the drive assembly 400 have moved forward to a position wherein the upper sets of teeth 429 thereon have just become disengaged from the printing wheel gears 118 and 121, after having rotated the printing wheels through four printing sectors, and advancing the web to the position of FIGURE 28, slide plates will be in the position of FIGURE 6. At this time, pressure roller 613 will be in its rearward position illustrated in FIGURE 3. Upon movement of the slide plates 412 to the position of FIGURE 6, therefore, the rear walls of the hook slots 439 in the forward edges of the slide plates engage opposite ends of the pressure roller shaft 614 which extend into the path of the slide plates as shown most clearly in FIGURE 24. Forward travel of the slide plates from their position of FIGURE 6 to their forward position of FIGURE 7, therefore, causes forward movement of the pressure roller 613 over the type plate 601 and printing wheels 608 and 609 with the pressure roller shaft 614 engaging in the lower tracks of the guide grooves 615. As just mentioned, this travel of the pressure roller along the lower tracks of the guide grooves 615 results in the web of paper 220 and inking ribbon 610 being pressed against the type plate 601 and printing wheels 608 and 609. The various informative and identifying information, illustrated in FIGURE 25, is thereby printed on the underside of the leading portion of the web 220.

Upon movement of the pressure roller 613 to the forward ends of the guide grooves 615, the ends of the roller shaft 614 engage a pair of spring pressed latch plates 619 which are resiliently biased to the phantom line position shown in FIGURE 3A. Continued forward movement of the slide plates 412, with the pressure roller shaft 614 engaged with the latch plate 619, causes pivoting of the latter to the solid line position of FIGURE 3A. The ends of the pressure roller shaft 614 are thereby permitted to move over the latch plates, the pressure roller being cammed upwardly by the forward ends of the guide grooves 615 to disengage the pressure roller shaft 614 from the latch plates 619 and permit the latter to be biased to their phantom line positions shown in FIGURE 3A.

During this upward camming of the pressure roller 613, at the forward ends of the guide grooves 615, the ends of the pressure roller shaft 614 move upwardly slightly in hook slots 439 of the slide plates 412. Immediately thereafter, the slide plates are dropped, as previously described, owing to forward movement of the slide bars 421 to retract the camming blocks 420 from below the slide supporting rollers 416. As a result of this dropping of the slide plates 412, the hooks 440 on the slide plates become engaged with the forward sides of the pressure roller shaft 614. During subsequent rearward travel of the slide plates, therefore, the pressure roller 613 is moved rearwardly with the plates. The upper edges of the latch plates 619 as well as the forward edge of the ribs 618, defining, in part the guide grooves 615, are formed with inclined camming surfaces 620 and 621. These surfaces cam the pressure roller shaft 614 upwardly during rearward travel of the slide plates, into the upper tracks of the guide grooves 615 for return of the pressure roller to its rear position of FIGURE 3 out of engagement with web of paper 220. Upon movement of the pressure roller 613 to the rear ends of the guide grooves 615, the roller drops under its own weight to the position of FIGURE 3, and thereby becomes disengaged from the hooks 440 on the slide plates to permit continued rearward movement of the latter.

Forward drum 611 on which the inking ribbon 610 is wound is spring-biased in a direction to turn in a counter-clockwise direction, as viewed in FIGURE 3, to wind the inking ribbon on the drum 611. The rear drum 612, on the other hand, is arranged to be rotated in a clockwise direction, as viewed in FIGURE 3, to wind the inking ribbon 610 thereon against the action of the spring-biased drum 611 by rotation of a gear 622 drivably connected with the drum 612 through a conventional ribbon reversing mechanism 623. Racks 437 and 438 on the right hand slide plate 412 (FIGURE 10) of the drive assembly 400 are located in the plane of but clear the gear 622 during forward movement of the slide plates in their upper position. During rearward travel of the slide plates in their lower position, however, the racks engage the gear 622 to wind a given amount of the ribbon from the drum 611 onto the drum 612. This results in a fresh portion of the ribbon 610 being used for each subsequent operation of the printing assembly 600. The arrangement of the conventional reversing mechanism 623 is such that upon winding of the ribbon 610 on the drum 612 to a position wherein a clip 624 on one side edge of the ribbon engages a trip 625 on the reversing mechanism 623, the latter is released to permit the ribbon 610 to unwind from the drum 612 and rewind on the drum 611 under the action of the spring bias of the latter drum. The reversing mechanism 623 is reset to accomplish winding of the web 610 on the drum 612, during each rearward movement of the slide plates 412, as just mentioned, by engagement of a second clip 626 on the ribbon 610 during the rewind operation, with the trip 625.

*Final web feed assembly*

The final web feed assembly will be described primarily with reference to FIGURES 2, 3, 5-7 and 24. The final web feed assembly comprises a pair of friction feed rollers 701 and 702 which are journalled at opposite ends in the supporting plates 505 (FIGURES 22 and 24) of the cutter blade assembly 500. These feed rollers 701 and 702 are located to receive therebetween and to frictionally engage the web of paper 220 for feeding of the latter by rotation of the rollers.

Fixed to opposite ends of the shaft of the upper feed roller 701, on the innersides of the adjacent supporting plates 505, are sprockets 703 (FIGURE 2) shown most clearly in FIGURE 24. Trained about these sprockets and second roller sprockets 704 (FIGURE 3) are drive chains 705.

Roller sprockets 704 are fixed on the inner ends of short stub shafts 706 (FIGURE 3) which are journalled in and extend outwardly of the adjacent supporting plates 505. Fixed on the extending ends of the shafts 706 are gears 707 (FIGURE 24). Gears 707 are arranged to mesh with the teeth of the racks 437 and 438, on the slide plates 412 during rearward travel of the latter in their lower position. Rotation in a clockwise direction, as viewed in FIGURE 3, is imparted to the gears 707 by the racks 437 and 438 during this rearward travel of the slide plates. The upper feed roller 701 is thereby rotated in a clockwise direction, as viewed in FIGURE 3, to advance the web of paper 220 through the machine.

The first racks which engage the gears 707, namely, racks 438, have a length such that the web 220 is advanced from the position of FIGURE 28, wherein the information contained on the type plate 601 and printing wheels 608 and 609 is imprinted on the coupon of FIGURE 25, to the position of FIGURE 29, wherein the forward edge of the web is spaced a distance $D^2$ (see FIGURE 25) ahead of the cutter blade 501.

In the interim between disengagement of the racks 438 from the gears 707 and subsequent engagement of the racks 437 with the gears 707, during which the web 220 is stationary, the cutter blade 501 is operated as previously discussed, to shear the web 220 to the form length $D^2$. Subsequent engagement of the racks 437 with the gears 707 finally advances the web 220 to the position of FIGURE 27 wherein the sheared or leading edge thereof is positioned a distance $D^1$ (FIGURE 25) ahead of the cutter blade 501. The web is thus positioned to receive the perforations P at the outset of the next cycle of operation of the machine, and the previously printed coupon extends through the slot 40 in the housing.

This completes the structure description of the present vending machine. A complete operating cycle of the machine will now be described.

*Operation*

After selecting a selected sponsor's name from the list contained on the plaque 46 on the front panel of the housing, the user of the machine first sets the dial 48 to position one of the numbers 605 on the dial, corresponding to the selected sponsor, opposite the arrow 50 on the front panel of the machine. The printing wheels 608 and 609 are thereby positioned for printing of the selected sponsor and his products on the coupon dispensed by the machine, as previously described. The user then inserts the proper coin or coins into the coin slot 38 which operates to release the latch 36' of a coin control mechanism C, thereby permitting the handle 36 to be pulled.

In accordance with the instructions 44 displayed on the machine, the user then pulls the handle 36 forwardly and thereafter releases the handle for return to its inoperative position of FIGURE 3 under the action of the biasing spring 145. During pulling of the handle, the rack bars 146 and 147 are raised to impart counter directions of rotation to the end printing wheels 105A and 105E and the timing switch 402 is set into operation. Upon release of the handle 36, the latter is relatched and the rack bars 146 and 147 return to their normal lower position under the action of the biasing spring 154. The teeth 150 are mounted on the rack bars for upward ratcheting movement, as previously noted, so as to not clash with the spinning gears 119 and 122 on the printing wheels during return of the racks 146 and 147 to their lower position. The three intermediate printing wheels 105B, 105C and 105D are rotated in one direction or the other from the two outer printing wheels by operation of the ball detent indexing means 123. This indexing means is preadjusted, by adjustment of the eccentrics 136 in the several indexing means 123, to effect the tendency of the intermediate wheels to rotate in one direction or the other and thereby alter, to a degree, the chance characteristics of the machine.

The five printing wheels are gradually decelerated to rest relative to one another by the restraining actions of the several indexing means 123 which interconnect adjacent printing wheels. The five printing wheels are gradually decelerated to rest relative to the housing by the restraining action of spring pressed pawls 141 and 142 on the gears 119 and 122 of the end printing wheels. The five printing wheels, therefore, come to rest relative to one another with their printing sectors aligned in chance fashion. Also, the five printing wheels come to rest relative to the frame of the machine in chance fashion with five aligned printing sectors 106 of the wheels in printing position relative to the web of paper 220. As noted, the web will at this time be in the position of FIGURE 27.

Raising the rack 147 by operation of the handle 36 also engages teeth 155 on the latter rack bar with the gear 221 on the inking roller to spin the latter in the ink well 201. The roller thereby acquires a coating of ink, excess ink being removed by the spring pressed scraper roller 223.

After a preset interval of time, sufficient to assure the printing wheels 105 having been brought to rest, in chance selected fashion, with five aligned printing sectors thereof in printing position, timing switch 402 closes to energize the drive motor 401. Slide plates 412 of the drive assembly 400 are thereby driven forwardly in the guide frames 409. During this forward travel of the slide plates, they will be in their upper positions of FIGURES 5 and 6 wherein they are supported by the elevated rollers 416.

Shortly after disengagement of the left hand slide of FIGURES 5–7, from the actuating arm 427 of the slide switch 426, timing switch 402 opens so that a circuit to the motor 401 through the timing switch is broken. Contacts 426B (FIGURE 26) of the slide switch 426 are, by this time, closed so that motor 401 remains energized.

Initial forward movement of the slide plates raises the perforating and cutting blade 501, by engagement of the pins 510 on the pivotal arms 506 of the cutter blade assembly with the cams 431 of the slides, to form the perforations P(FIGURE 25) in the web 220. Continued forward movement of the slide plates disengages the pins 510 on the cutter blade assembly from the cams 431 of the slide plates, allowing the cutter blade 501 to return to its lower position. Immediately after return of the blade 501 to its lower position, the four teeth 429 along the upper edges of the slide plates 412 engage the gears 118 and 121 on the two outer printing wheels 105A and 105E. Simultaneously, the inking roller shaft 209 is disengaged from the forward narrow portions 430A of the cam slots 430 in the slides 412, wherein it is retained in its lower position in FIGURE 3, and relatively moves into the wide portions 430B of the cam slots. The inking roller 210 is thereby permitted to move upwardly under the action of a counterweight 214, to press the silk screen 215 and web of paper 220 against the peripheries of the printing wheels 105.

The rotation through four printing sectors imparted to the printing wheels by engagement of the teeth 429 with the printing wheel gears 118 and 121, advances the web of paper 220 through the machine from the position of FIGURE 27 to the position of FIGURE 28, during which the four rows of chance selected indicia C (FIGURE 25) are printed on the web. During this advancing of the web by rotation of the printing wheels, the silk screen 215 is drawn forwardly against the action of the spring biased drum 218 on which it is wound.

Upon disengagement of the teeth 429 on the slide plates 412, from the printing wheel gears 118 and 121, to terminate the printing of the chance selected indicia as well as advancing of the web 220, the slides will be in their position of FIGURE 6. Termination of the printing operation and advancing of the web is accomplished at this time, as hereinbefore noted, by virtue of the fact that rotation of the printing wheels 105 is terminated and the inclined camming edges 430C of the cam slots 430 in the slide plates 412 engage the inking roller shaft 209 to cam the inking roller to its lower position against the action of a counterweight 214.

Upon movement of the slides to the position of FIGURE 6, the shaft 614 of the pressure roller 613 becomes engaged with the rear walls of the hook slots 439 in the slide plates 412. Continued forward travel of the slide plates, therefore, moves the pressure roller over the web of paper 220, which at this time will be in the position of FIGURE 28 wherein its leading edge portion overlies the type plate 601 and printing wheels 608 and 609. The information contained on the type plate 601 and printing wheels 608 and 609 are thereby imprinted on the underside of the web 220. Upon reaching the forward ends of the guide groove 615, the latch plates 619 associated with the guide grooves engage under the ends of the pressure roller shaft 614. The pressure roller is thereby retained in elevated position for engagement by hooks 440 on the forward ends of the slide plates 412 and subsequent retraction with the slide plates.

In the forward limiting position of the slide plates, counterweight raising solenoid 242 becomes energized by initial forward movement of the slide bars 421 to actuate the forward slide switch 246.

Forward movement of the slide bars 421 results in the slide supporting rollers 416 dropping to their depressed positions of FIGURE 7 with resultant dropping of the slide plates 412 to their lower positions. The driving gears 407 thereby become engaged with the upper rack teeth 414 on the slide plates 412. The slide plates 412 are now driven in a rearward direction.

During rearward travel of the slides 412 in their lower position, web 220 is initially advanced from its position of FIGURE 28 to its position of FIGURE 29 by engagement of the racks 438 on the slide plates with the gears 707 of the final web feed assembly 700. Immediately thereafter, cams 433 on the slide plates engage the extending pins 511 on the blade 501 to elevate the latter and shear the web 220 a distance $D^2$ (FIGURE 25) from its forward edge. After return of the blade 501 to its lower position, the second racks 437 engage the gears 707 of the final web feed assembly to cause final advancing of the web 220, to the position of FIGURE 27. The web is thus positioned for repetition of the operation cycle.

Continued rearward movement of the slide plates 412 to their rear limiting position results in actuation of the rear slide switch 426 to deenergize the drive motor 401 and reenergize the slide bar solenoids 424. Energization of the solenoids 424 retracts the slide bars 421 to elevate the slide plates to their position of FIGURE 5 in readiness for the next operating cycle. Retraction of the left hand slide bar 421, shown in FIGURES 5–7, results in reopening of forward slide switch 246. Counterweight solenoid is thereby deenergized and the mass of the counterweight again acts to bias the inking roller 210 upwardly in readiness for the next printing cycle.

Obviously, numerous modifications in design, arrangement of parts and instrumentalities of the invention are possible. Thus, the particular form of chance selected indicia which are printed may be varied to suit a particular use of the machine. Also, the number of chance selection printing wheels, as well as the number of printing sectors on each and the number of printing sectors through which they are rotated during each operation of the machine, so as to provide for printing a desired number of rows of chance selected indicia on each coupon may be varied.

It will be apparent, therefore, that there has been described and illustrated a machine for printing and dispensing coupons, charts and the like bearing chance selected indicia, which is fully capable of obtaining the objects and advantages preliminarily set forth.

I claim:

1. In a chance operated printing device of the character described, chance printing means including a plurality of coaxial, rotary printing wheels arranged side-by-side and each defining a plurality of printing sectors about its periphery, printing type in said sectors shaped to imprint different indicia, actuating means operable by a user of the machine to spin the two outer ones of said wheels in opposite directions, spring pressed detent means interconnecting the adjacent wheels for spinning of the intermediate wheels from said outer wheels, braking means for bringing said outer wheels to rest in chance fashion after spinning thereof, and said detent means and braking means being arranged to bring all of the wheels to rest with their printing sectors aligned and with one printing sector of each wheel in a predetermined printing position relative to the machine.

2. In a chance operated printing device of the character described, a housing, at least one spinnable, chance positioned printing wheel mounted for relatively free rotation in the housing whereby the wheel is adapted to be spun and to thereafter come to rest in chance fashion, said wheel having a series of printing sectors about its periphery, printing type in said printing sectors defining different indicia to be printed, said device having a zone through which said sectors move when the wheel turns and in which one of said sectors is located in the normal at rest position of the wheel, manually operable mechanism initially releasably engageable with the wheel for spinning the latter, arresting mechanism for thereafter gradually bringing the wheel to normal rest position in chance fashion with a printing sector of the wheel located in said zone, an inking roller normally spaced from said wheel in said zone, a strip of paper within the housing having a leading portion located between said roller and wheel, first means normally disengaged from the wheel for rotating the latter through a given number of printing sectors less than the total number of sectors on the wheel, second means for engaging said first means with the wheel to rotate the latter through said given number of printing sectors and simultaneously moving said roller toward the wheel to press the paper against the periphery of the wheel whereby the indicia contained in a number of successive printing sectors are imprinted on said strip of paper, said strip being advanced to a first position by rotation of the printing wheel through said given number of printing sectors, third means for moving said roller away from said wheel upon rotation of the wheel through said given number of printing sectors, additional printing means including a type plate in the housing positioned to underlie the leading portion of the strip when the latter is in said first position, inking means associated with said plate, fourth means operable while said strip is in said first position to press the strip against said type plate for imprinting the strip with the indicia defined by type on said plate, fifth means operable after printing of the last-mentioned indicia on the strip to advance the latter to a second position of extension through an opening in the housing, sixth means operable while the strip is in said second position to sever the imprinted portion of the strip from the remainder of the latter, seventh means for finally advancing the strip in the machine to position the strip for the next operation of the machine after severing of the strip, motor operated means operatively connected to said first through seventh means for operating said first through seventh means in predetermined sequential order, and means actuated by said manually operable mechanism for activating said motor operated means after said wheel has been brought to rest.

3. In a chance operated printing device of the character described, a support, a spinnable, chance positioned printing wheel mounted for relatively free rotation on the support whereby the wheel is adapted to be spun and to thereafter come to rest in chance fashion, a plurality of printing elements mounted on said printing wheel in a given number of printing sectors circumferentially spaced about the periphery of the wheel, said device having a zone through which said sectors move when the wheel turns and in which one of said sectors is located in the normal at rest position of the wheel, manually operable mechanism initially releasably engageable with the wheel for spinning the latter, arresting mechanism for thereafter gradually bringing the wheel to normal rest position in chance fashion with a printing sector of the wheel located in said zone, a pressure member on said support normally spaced from the periphery of the wheel in said zone for receipt of a web of paper between the member and wheel, wheel operating means normally disengaged from said wheel for permitting free rotation and chance positioning thereof and movable into driving engagement with the wheel to turn the latter through a predetermined number of printing sectors, means for simultaneously moving said operating means into driving engagement with said wheel after the latter has been brought to rest to rotate the wheel through said predetermined number of printing sectors and relatively moving said printing wheel and pressure member toward one another to press a web of paper therebetween against the periphery of said wheel and feed the web past the wheel, and means for causing the printing elements on the wheel to imprint the web as it is fed past the wheel.

4. In a chance operated printing device of the character described, a support, a plurality of coaxial, spinnable, chance positioned wheels mounted side by side for relatively free and independent rotation on said support whereby the wheels are adapted to be spun and to thereafter come to rest in chance fashion, a plurality of printing elements mounted on each wheel in a given number of printing sectors circumferentially spaced about the periphery of the respective wheel, said device having a zone through which said sectors move when the wheels turn and in which one of said sectors of each wheel is located in the normal at rest position of the respective wheel, manually operable means initially releasably engageable with the two end wheels for spinning the latter in opposite directions, arresting means interconnecting adjacent wheels and arresting means connecting one wheel and the support for causing the intermediate wheels to be spun by spinning of the end wheels and thereafter bringing all of the wheels to normal rest position with a printing sector of each wheel located in said zone, a pressure member on said support normally spaced from the peripheries of said wheels in said zone for receipt of a web of paper between said member and wheels, wheel drive means normally disengaged from the wheels for permitting said free rotation and chance positioning thereof, operating means activated by said manually operable mechanism for simultaneously relatively moving said wheels and member toward one another after the wheels have been brought to rest to press a web of paper against the peripheries of said wheels and operatively engaging said drive means with the wheels for turning the latter through a predetermined number of printing sectors whereby the web is fed past the wheels, and means for causing the printing elements on the wheels to imprint the web as it is fed past the wheels.

5. In a chance operated printing device of the character described, a support, a spinnable, chance positioned printing wheel mounted for relatively free rotation on the support whereby the wheel is adapted to be spun and to thereafter come to rest in chance fashion, a plurality of printing elements mounted on said printing wheel in a given number of printing sectors circumferentially spaced about the periphery of the wheel, said device having a zone through which said sectors move when the wheel turns and in which one of said sectors is located in the normal at rest position of the wheel, manually operable mechanism initially releasably engageable with the wheel for spinning the later, arresting mechanism for thereafter gradually bringing the wheel to normal rest position in chance fashion with a printing sector of the wheel located in said zone, a pressure member on said support normally spaced from the periphery of the wheel in said zone for receipt of a web of paper between the member and wheel, biasing means for urging said pressure member toward said printing wheel, operating means for said wheel having a normal position disengaged from the wheel for permitting said free rotation and chance positioning thereof and movable in one direction from said normal position into driving engagement with said wheel to turn the latter through a predetermined number of printing sectors, pressure member engaging means on said operating means for retaining said pressure member in its normal position spaced from said printing wheel when said operating means is in its normal position disengaged from said wheel and permitting movement of said pressure member toward the wheel under the action of said biasing means upon movement of said operating means in said one direction into driving engagement with the wheel whereby to press the web of paper against the wheel during rotation of the latter through said predetermined number of printing sectors and feed the web past the wheel, means activated by said manually operable mechanism for moving said wheel operating means in said one direction from said normal position thereof after the wheel has been brought to rest, whereby to rotate the wheel through said predetermined number of printing sectors and effect movement of the pressure member toward the wheel, and thereafter returning the operating means to normal position, and means for causing the printing elements on the wheel to imprint the web as it is fed past the wheel.

6. The subject matter of claim 5 wherein said pressure member comprises a pressure roller, said operating means comprise a pair of parallel movable slide plates on said support at opposite ends of the roller, and said pressure member engaging means comprise cam means on said plates, said roller having a shaft, opposite ends of which are operatively engaged with said cam means, said cam means being shaped to retain said pressure roller away from said wheel in the normal position of the slide plates and to accommodate movement of the roller toward the wheel under the action of said biasing means upon movement of said plates in said direction to a first position and to cam said roller away from the wheel upon continued movement of the slide plates in said direction to a second position, said operating means further comprising cooperating engageable means on one slide plate and the printing wheel for rotating the latter through said predetermined number of printing sectors during movement of the plates between said first and second positions, said latter means being disengaged in said normal position of the slide plates.

7. In a chance operated printing device of the character described, a support, a spinnable, chance positioned printing wheel mounted for relative free rotation on the support whereby the wheel is adapted to be spun and to thereafter come to rest in chance fashion, a plurality of printing elements mounted on said printing wheel in a given number of printing sectors circumferentially spaced about the periphery of the wheel, said device having a zone through which said sectors move when the wheel turns and in which one of said sectors is located in the normal at rest position of the wheel, manually operable mechanism initially releasably engageable with the wheel for spinning the latter, arresting mechanism for thereafter gradually bringing the wheel to normal rest position in chance fashion with a printing sector of the wheel located in said zone, a slide plate on said support at one side of and parallel to said wheel, said plate being movable in one direction in its plane along a first path from a normal position to a limiting position, cooperating drive means on said plate and wheel for turning the latter through a predetermined number of printing sectors during movement of said plate in said first direction between said positions along said path, said drive means being disengaged in said normal position of the plate to permit said free rotation and chance positioning of said wheel, said plate being movable in the opposite direction from said limiting position to said normal position along a second path wherein said drive means on the plate clear the drive means on the wheel, guide means for guiding said plate for movement along said first path in said one direction of movement of the plate and for movement along said second path in said opposite direction of movement of the plate, and means activated by said manually operable mechanism for moving said plate after said wheel has been brought to rest.

8. The subject matter of claim 7 wherein said guide means comprises a guide member movable to first and second positions for slidably supporting said plate for movement along said first and second paths, respectively, and means for moving said guide member to said first position upon movement of said plate to said normal position and to said second position upon movement of said plate to said limiting position.

9. In a chance operated printing device of the character described, a support, a spinnable, chance positioned printing wheel mounted for relatively free rotation on the support whereby the wheel is adapted to be spun and to thereafter come to rest in chance fashion, a plurality of printing elements mounted on said printing wheel in a given number of printing sectors circumferentially spaced about the periphery of the wheel said device having a zone through which said sectors move when the wheel turns and in which one of said sectors is located in the normal at rest position of the wheel, manually operable mechanism initially releasably engageable with the wheel for spinning the latter, arresting mechanism for thereafter gradually bringing the wheel to normal rest position in chance fashion with a printing sector of the wheel located in said zone, a pressure member on said support normally spaced from the periphery of the wheel in said zone for receipt of a web of paper between the member and wheel, a platen mounting printing elements, a second pressure member normally spaced from and movable against said platen and between which latter pressure member and said platen said web is receivable, operating means for initially moving said first-mentioned pressure member toward said wheel to press the web against the wheel and simultaneously turning said wheel through a predetermined number of printing sectors to feed said web a predetermined distance past the wheel and over said platen and thereafter moving said second pressure member against said platen to press the web against the platen, said operating means normally releasing said wheel for said free rotation and chance positioning thereof, means activated by said manually operable mechanism, for causing said wheel printing elements to imprint the web as the latter is fed past the wheel, and means for causing said platen printing elements to imprint the web when the latter is pressed against the platen.

10. The subject matter of claim 9 wherein said operating means includes means for moving said first-mentioned pressure member away from said wheel after rotation of the latter through said predetermined number of printing sectors, means for moving said second pressure member away from said platen after movement of the latter pressure member against the platen, and means for thereafter advancing the web a predetermined distance past said wheel and platen while said pressure members are spaced from the wheel and platen, respectively.

11. In a chance operated printing device of the character described, a support, a spinnable, chance positioned printing wheel mounted for relatively free rotation on the support whereby the wheel is adapted to be spun and to thereafter come to rest in chance fashion, a plurality of printing elements mounted on said printing wheel in a given number of printing sectors circumferentially spaced about the periphery of the wheel, said device having a zone through which said sectors move when the wheel turns and in which one of said sectors is located in the normal at rest position of the wheel, manually operable means initially releasably engageable with the wheel for spinning the latter, arresting means for thereafter gradually bringing the wheel to normal rest position in chance fashion with a printing sector of the wheel located in said zone, wheel operating means normally disengaged from said wheel to permit initial spinning of the latter by said manually operable means and subsequently movable into driving engagement with the wheel to turn the latter through a predetermined number of printing sectors, a pressure roller opposite and spaced from the wheel in said zone for receipt of a web of paper between the wheel and roller, actuating means operable in response to operation of said manually operable means for moving said roller toward the wheel and moving said wheel operating means into driving engagement with the wheel to turn the latter through said predetermined number of printing sectors upon arresting of said wheel by said arresting means whereby a web between the roller and wheel is fed past the wheel, and means to cause the printing elements on the wheel to imprint the web.

12. The subject matter of claim 11 including additional printing wheels rotatably mounted on said support coaxially with said first-mentioned wheel, said printing wheels being independently rotatable, additional arresting means interconnecting said wheels for effecting rotation of said additional wheels with said first-mentioned wheel when the latter is turned by said wheel operation means and gradually arresting said wheels relative to one another in chance fashion with their printing sectors aligned.

13. The subject matter of claim 11 wherein said actuating means comprises electrical drive means for moving said roller and wheel operating means, and time delay control means for energizing said drive means a predetermined length of time after operation of said manually operable means.

References Cited in the file of this patent
UNITED STATES PATENTS

| | | |
|---|---|---|
| 442,683 | Kennedy et al. | Dec. 16, 1890 |
| 451,956 | Sanderson | May 12, 1891 |
| 1,087,252 | Muzzy | Feb. 17, 1914 |
| 2,099,173 | Norris | Nov. 16, 1937 |
| 2,235,130 | Webb | Mar. 18, 1941 |
| 2,253,311 | Ward | Aug. 19, 1941 |